(12) United States Patent
Matsuki et al.

(10) Patent No.: US 8,117,387 B2
(45) Date of Patent: Feb. 14, 2012

(54) STORAGE SYSTEM AND METHOD OF MANAGING A STORAGE SYSTEM USING A MANAGEMENT APPARATUS

(75) Inventors: Kunihito Matsuki, Odawara (JP); Seiichi Higaki, Ninomiya (JP); Koji Sonoda, Sagamihara (JP)

(73) Assignee: Hitachi Ltd., Tokyo (JP)

( * ) Notice: Subject to any disclaimer, the term of this patent is extended or adjusted under 35 U.S.C. 154(b) by 770 days.

(21) Appl. No.: 12/219,047

(22) Filed: Jul. 15, 2008

(65) Prior Publication Data
US 2009/0287887 A1  Nov. 19, 2009

(30) Foreign Application Priority Data
May 14, 2008  (JP) ................................ 2008-126926

(51) Int. Cl.
*G06F 12/00* (2006.01)
(52) U.S. Cl. ......... 711/114; 711/170; 709/224; 709/226
(58) Field of Classification Search .................. None
See application file for complete search history.

(56) References Cited

U.S. PATENT DOCUMENTS

| | | | |
|---|---|---|---|
| 7,200,622 B2 * | 4/2007 | Nakatani et al. ......... | 707/999.01 |
| 2003/0055943 A1 | 3/2003 | Kanai | |
| 2004/0143608 A1 | 7/2004 | Nakano et al. | |
| 2005/0125426 A1 | 6/2005 | Minematsu | |
| 2005/0210098 A1 | 9/2005 | Nakamichi et al. | |
| 2006/0184733 A1 | 8/2006 | Yamamoto et al. | |
| 2006/0220533 A1 | 10/2006 | Achiwa et al. | |
| 2006/0253549 A1 * | 11/2006 | Arakawa et al. .............. | 709/217 |
| 2007/0073782 A1 | 3/2007 | Nakatani et al. | |
| 2008/0016311 A1 | 1/2008 | Harada | |
| 2008/0040483 A1 | 2/2008 | Nakatani et al. | |

FOREIGN PATENT DOCUMENTS

| | | |
|---|---|---|
| EP | 1443411 A2 | 1/2004 |
| EP | 1758017 A1 | 2/2006 |
| EP | 1770494 A1 | 3/2006 |
| EP | 1939747 A1 | 9/2007 |
| JP | 2004-227127 | 1/2003 |
| JP | 2005-267327 | 3/2004 |

OTHER PUBLICATIONS

The Extended European Search Report, dated May 8, 2009.

* cited by examiner

*Primary Examiner* — Reginald Bragdon
*Assistant Examiner* — Baboucarr Faal
(74) *Attorney, Agent, or Firm* — Stites & Harbison, PLLC; Juan Carlos A. Marquez, Esq.

(57) ABSTRACT

A storage system has NAS apparatuses each including virtual file servers to be provided to host apparatuses, a storage apparatus including logical units, and a management apparatus for managing the NAS apparatuses and the storage apparatus. The management apparatus requests the NAS apparatuses and the storage apparatus to transfer management information, acquires the management information. The management apparatus then creates system performance information concerning the virtual file servers based on the acquired management information to display the created system performance information on a user interface.

6 Claims, 36 Drawing Sheets

NAS HEAD PERFORMANCE MANAGEMENT TABLE 400

| 401 | 402 | 403 | 404 | 405 | 406 | 407 | 408 408a 408b | | 409 | 410 |
|---|---|---|---|---|---|---|---|---|---|---|
| NAS NUMBER | NAS-CPU OPERATING RATIO | NAS-MEMORY USAGE RATIO | VNAS NUMBER | VNAS-CPU OPERATING RATIO | VNAS-MEMORY USAGE RATIO | MAIN/SUB PATH | VNAS-IOPS | | CONTROLLER NUMBER | CONTROLLER PATH |
| NAS_1 | 55 | 28 | VNAS_1 | 40 | 20 | MAIN | Pass1 | 400 | 0 | 0A |
| | | | | | | SUB | Pass2 | 0 | 1 | 1B |
| | | | VNAS_2 | 10 | 5 | MAIN | Pass1 | 100 | 0 | 0A |
| | | | | | | SUB | Pass2 | 0 | 1 | 1B |
| | | | VNAS_3 | 5 | 3 | MAIN | Pass1 | 30 | 0 | 0A |
| | | | | | | SUB | Pass2 | 0 | 1 | 1B |
| NAS_2 | 27 | 10 | VNAS_4 | 10 | 5 | MAIN | Pass1 | 100 | 1 | 1B |
| | | | | | | SUB | Pass2 | 0 | 0 | 0A |
| | | | VNAS_5 | 2 | 1 | MAIN | Pass1 | 5 | 1 | 1B |
| | | | | | | SUB | Pass2 | 0 | 0 | 0A |
| | | | VNAS_6 | 5 | 4 | MAIN | Pass1 | 30 | 1 | 1B |
| | | | | | | SUB | Pass2 | 0 | 0 | 0A |

FIG. 4

NAS HEAD PERFORMANCE MANAGEMENT TABLE 400

| NAS NUMBER 401 | NAS-CPU OPERATING RATIO 402 | NAS-MEMORY USAGE RATIO 403 | VNAS NUMBER 404 | VNAS-CPU OPERATING RATIO 405 | VNAS-MEMORY USAGE RATIO 406 | MAIN/SUB PATH 407 | 408a | VNAS-IOPS 408 408b | CONTROLLER NUMBER 409 | CONTROLLER PATH 410 |
|---|---|---|---|---|---|---|---|---|---|---|
| NAS_1 | 55 | 28 | VNAS_1 | 40 | 20 | MAIN | Pass1 | 400 | 0 | 0A |
|  |  |  |  |  |  | SUB | Pass2 | 0 | 1 | 1B |
|  |  |  | VNAS_2 | 10 | 5 | MAIN | Pass1 | 100 | 0 | 0A |
|  |  |  |  |  |  | SUB | Pass2 | 0 | 1 | 1B |
|  |  |  | VNAS_3 | 5 | 3 | MAIN | Pass1 | 30 | 0 | 0A |
|  |  |  |  |  |  | SUB | Pass2 | 0 | 1 | 1B |
| NAS_2 | 27 | 10 | VNAS_4 | 10 | 5 | MAIN | Pass1 | 100 | 1 | 1B |
|  |  |  |  |  |  | SUB | Pass2 | 0 | 0 | 0A |
|  |  |  | VNAS_5 | 2 | 1 | MAIN | Pass1 | 5 | 1 | 1B |
|  |  |  |  |  |  | SUB | Pass2 | 0 | 0 | 0A |
|  |  |  | VNAS_6 | 5 | 4 | MAIN | Pass1 | 30 | 1 | 1B |
|  |  |  |  |  |  | SUB | Pass2 | 0 | 0 | 0A |

FIG. 9

CONTROLLER MANAGEMENT TABLE 900

| CONTROLLER NUMBER 901 | PROCESSOR OPERATING RATIO 902 | MEMORY USAGE RATIO 903 | RAID GROUP 904 | RAID LEVEL 905 | PDEV CAPACITY (GB) 906 | ROTATING SPEED (rpm) 907 | RAID GROUP -IOPS 908 | HLUN 909 | LUN 910 | LUN SIZE (MB) 911 | LU-IOPS 912 |
|---|---|---|---|---|---|---|---|---|---|---|---|
| 0 | 100 | 80 | 6 | 5(8D+1P) | 72 | 100000 | 400 | 0 | 32 | 100000 | 30 |
| | | | | | | | | 1 | 33 | 100000 | 50 |
| | | | | | | | | 2 | 34 | 100000 | 50 |
| | | | 7 | 5(8D+1P) | 72 | 100000 | 130 | 3 | 35 | 100000 | 10 |
| | | | | | | | | 4 | 36 | 100000 | 30 |
| | | | | | | | | 5 | 37 | 100000 | 0 |
| | | | 8 | 5(8D+1P) | 72 | 100000 | 0 | 6 | 38 | 100000 | 0 |
| | | | 9 | 5(8D+1P) | 72 | 100000 | 0 | 7 | 39 | 100000 | 0 |
| 1 | 20 | 20 | 6 | 5(8D+1P) | 72 | 100000 | 100 | 0 | 32 | 100000 | 0 |
| | | | | | | | | 1 | 33 | 100000 | 0 |
| | | | 7 | 5(8D+1P) | 72 | 100000 | 0 | 2 | 34 | 100000 | 0 |
| | | | | | | | | 3 | 35 | 100000 | 0 |
| | | | 8 | 5(8D+1P) | 72 | 100000 | 5 | 4 | 36 | 100000 | 10 |
| | | | | | | | | 5 | 37 | 100000 | 5 |
| | | | 9 | 5(8D+1P) | 72 | 100000 | 30 | 6 | 38 | 100000 | 0 |
| | | | | | | | | 7 | 39 | 100000 | 30 |

FIG. 10

RAID GROUP UNUSED CAPACITY MANAGEMENT TABLE 1000

| RAID GROUP | UNUSED CAPACITY (MB) |
|---|---|
| 0 | 0 |
| 1 | 0 |
| 2 | 0 |
| 3 | 0 |
| 4 | 0 |
| 5 | 0 |
| 6 | 276000 |
| 7 | 276000 |
| 8 | 476000 |
| 9 | 476000 |
| 10 | 576000 |
| 11 | 576000 |

STORAGE FAILURE NOTIFICATION TABLE 1100

| FAILED COMPONENT | CONTROLLER | SLOT | UNIT | HDU | PORT |
|---|---|---|---|---|---|
| CONTROLLER | 0 | - | - | - | - |
| MEMORY | 1 | 0 | - | - | - |
| DRIVE | - | - | 3 | 13 | - |
| HOST CONNECTOR | 0 | - | - | - | 0A |

FIG. 14

VNAS PERFORMANCE MANAGEMENT TABLE 1400

| 1401 | 1402 | 1403 | 1404 | 1405 | 1406 | 1407 | 1408 | | 1409 | 1410 | 1411 | 1412 |
|---|---|---|---|---|---|---|---|---|---|---|---|---|
| NAS NUMBER | NAS-CPU OPERATING RATIO | NAS-MEMORY USAGE RATIO | VNAS NUMBER | VNAS-CPU OPERATING RATIO | VNAS-MEMORY USAGE RATIO | MAIN/SUB PATH | VNAS-IOPS | | CONTROLLER NUMBER | CONTROLLER PATH | CONTROLLER-CPU OPERATING RATIO | CONTROLLER-MEMORY USAGE RATIO |
| NAS_1 | 55 | 28 | VNAS_1 | 40 | 20 | MAIN | Pass1 | 400 | 0 | 0A | 75 | 60 |
| | | | | | | SUB | Pass2 | 0 | 1 | 1B | 0 | 0 |
| | | | VNAS_2 | 10 | 5 | MAIN | Pass1 | 100 | 0 | 0A | 10 | 15 |
| | | | | | | SUB | Pass2 | 0 | 1 | 1B | 0 | 0 |
| | | | VNAS_3 | 5 | 3 | MAIN | Pass1 | 30 | 0 | 0A | 0 | 5 |
| | | | | | | SUB | Pass2 | 0 | 1 | 1B | 0 | 0 |
| NAS_2 | 27 | 10 | VNAS_4 | 10 | 5 | MAIN | Pass1 | 100 | 1 | 1B | 20 | 7 |
| | | | | | | SUB | Pass2 | 0 | 0 | 0B | 0 | 0 |
| | | | VNAS_5 | 2 | 1 | MAIN | Pass1 | 5 | 1 | 1B | 1 | 1 |
| | | | | | | SUB | Pass2 | 0 | 0 | 0B | 0 | 0 |
| | | | VNAS_6 | 5 | 4 | MAIN | Pass1 | 30 | 1 | 1B | 6 | 2 |
| | | | | | | SUB | Pass2 | 0 | 0 | 0B | 0 | 0 |

FIG. 15

LU PERFORMANCE MANAGEMENT TABLE 1500

| RAID GROUP 1501 | RAID LEVEL 1502 | RAID GROUP-IOPS 1503 | HLUN 1504 | LUN 1505 | NAS NUMBER 1506 | VNAS NUMBER 1507 | LUN SIZE (MB) 1508 | LU-IOPS 1509 |
|---|---|---|---|---|---|---|---|---|
| 6 | 5(8D+1P) | 400 | 0 | 32 | NAS_1 | VNAS_1 | 300000 | 300 |
| | | | 1 | 33 | NAS_1 | VNAS_1 | 300000 | 50 |
| | | | 2 | 34 | NAS_1 | VNAS_1 | 300000 | 50 |
| 7 | 5(8D+1P) | 230 | 3 | 35 | NAS_1 | VNAS_2 | 300000 | 100 |
| | | | 4 | 36 | NAS_1 | VNAS_3 | 300000 | 30 |
| | | | 5 | 37 | NAS_2 | VNAS_4 | 300000 | 100 |
| 8 | 5(8D+1P) | 5 | 6 | 38 | NAS_2 | VNAS_5 | 300000 | 5 |
| 9 | 5(8D+1P) | 30 | 7 | 39 | NAS_2 | VNAS_6 | 300000 | 30 |

FIG. 16

VNAS PERFORMANCE SIMULATION TABLE 1600

| NAS NUMBER | NAS-CPU OPERATING RATIO | NAS-MEMORY USAGE RATIO | VNAS NUMBER | VNAS-CPU OPERATING RATIO | VNAS-MEMORY USAGE RATIO | MAIN/SUB PATH | VNAS-IOPS | | CONTROLLER NUMBER | CONTROLLER PATH | CONTROLLER-CPU OPERATING RATIO | CONTROLLER-MEMORY USAGE RATIO |
|---|---|---|---|---|---|---|---|---|---|---|---|---|
| 1601 | 1602 | 1603 | 1604 | 1605 | 1606 | 1607 | 1608 | | 1609 | 1610 | 1611 | 1612 |
| NAS_1 | 45 | 23 | VNAS_1 | 40 | 20 | MAIN | Pass1 | 400 | 0 | 0A | 75 | 60 |
| | | | | | | SUB | Pass2 | 0 | 1 | 1B | 0 | 0 |
| | | | VNAS_3 | 5 | 3 | MAIN | Pass1 | 30 | 0 | 0A | 6 | 5 |
| | | | | | | SUB | Pass2 | 0 | 1 | 1B | 0 | 0 |
| NAS_2 | 27 | 15 | VNAS_4 | 10 | 5 | MAIN | Pass1 | 100 | 1 | 1A | 20 | 7 |
| | | | | | | SUB | Pass2 | 0 | 0 | 0B | 0 | 0 |
| | | | VNAS_5 | 2 | 1 | MAIN | Pass1 | 5 | 1 | 1A | 1 | 1 |
| | | | | | | SUB | Pass2 | 0 | 0 | 0B | 0 | 0 |
| | | | VNAS_8 | 5 | 4 | MAIN | Pass1 | 30 | 1 | 1A | 6 | 2 |
| | | | | | | SUB | Pass2 | 0 | 0 | 0B | 0 | 0 |
| | | | VNAS_2 | 10 | 5 | MAIN | Pass1 | 100 | 0 | 1A | 19 | 15 |
| | | | | | | SUB | Pass2 | 0 | 1 | 0B | 0 | 0 |

FIG. 17

LU PERFORMANCE SIMULATION TABLE 1700

| RAID GROUP 1701 | RAID LEVEL 1702 | RAID GROUP-IOPS 1703 | LUN 1704 | HLUN 1705 | NAS NUMBER 1706 | VNAS NUMBER 1707 | LUN SIZE (MB) 1708 | LU-IOPS 1709 |
|---|---|---|---|---|---|---|---|---|
| 6 | 6(8D+1P) | 100 | 33 | 1 | NAS_1 | VNAS_1 | 100000 | 50 |
|  |  |  | 34 | 2 | NAS_1 | VNAS_1 | 100000 | 50 |
| 7 | 6(8D+1P) | 130 | 35 | 3 | NAS_1 | VNAS_2 | 100000 | 100 |
|  |  |  | 36 | 4 | NAS_1 | VNAS_3 | 100000 | 30 |
| 8 | 6(8D+1P) | 5 | 37 | 5 | NAS_2 | VNAS_4 | 100000 | 100 |
| 9 | 6(8D+1P) | 30 | 38 | 6 | NAS_2 | VNAS_5 | 100000 | 5 |
|  |  |  | 39 | 7 | NAS_2 | VNAS_6 | 100000 | 30 |
| 10 | 6(8D+1P) | 300 | 32 | 0 | NAS_1 | VNAS_1 | 100000 | 300 |

FIG. 18

THRESHOLD VALUE MANAGEMENT TABLE 1800

| CONFIGURATION ITEMS | RAID LEVEL | PDEV CAPACITY (GB) | ROTATING SPEED (rpm) | THRESHOLD VALUE |
|---|---|---|---|---|
| NAS-CPU OPERATING RATIO | - | - | - | 90% |
| NAS-MEMORY USAGE RATIO | - | - | - | 90% |
| VNAS-IOPS | - | - | - | 7000 IOPS |
| CONTROLLER-CPU OPERATING RATIO | - | - | - | 90% |
| CONTROLLER-MEMORY USAGE RATIO | - | - | - | 90% |
| RAID GROUP-IOPS | 5(8D+1P) | 72 | 10000 | 414 IOPS |
| RAID GROUP-IOPS | 5(8D+1P) | 72 | 15000 | 621 IOPS |
| RAID GROUP-IOPS | 5(8D+1P) | 145 | 10000 | 443 IOPS |
| RAID GROUP-IOPS | 5(8D+1P) | 145 | 15000 | 676 IOPS |
| RAID GROUP-IOPS | 5(3D+1P) | 72 | 10000 | 310 IOPS |
| RAID GROUP-IOPS | 5(3D+1P) | 72 | 15000 | 388 IOPS |
| RAID GROUP-IOPS | 5(3D+1P) | 145 | 10000 | 316 IOPS |
| RAID GROUP-IOPS | 5(3D+1P) | 145 | 15000 | 436 IOPS |

FIG. 19

MIGRATION MANAGEMENT TABLE 1900

| MIGRATION-TARGET LUN (1901) | MIGRATION DESTINATION RAID GROUP (1902) |
|---|---|
| 32 | 10 |
| ⋮ | ⋮ |

STORAGE SYSTEM AND METHOD OF MANAGING A STORAGE SYSTEM USING A MANAGEMENT APPARATUS

CROSS-REFERENCES

This application relates to and claims priority from Japanese Patent Application No. 2008-126926, filed on May 14, 2008, the entire disclosure of which is incorporated herein by reference.

BACKGROUND

The present invention relates in general to a storage system and a management method of a storage system using a management apparatus, and in particular to technology for managing a storage system including a NAS apparatus capable of providing a plurality of virtual file servers to each of a plurality of host apparatuses.

As one type of network storage technology, NAS (Network Attached Storage) is being widely used. In a storage system under a NAS environment, a host apparatus accesses a storage resource (i.e., data) in a storage apparatus via a NAS server (NAS apparatus) on a network. The NAS server is a certain type of file server provided with a NAS-OS. A VNAS (Virtual NAS) is known as technology that realizes a plurality of virtual NAS environments in a single NAS server.

For example, Japanese Patent Laid-Open Publication No. 2004-227127 discloses technology that realizes a virtual server function for individually permitting and restricting access authority to physical and logical devices. Specifically, in Japanese Patent Laid-Open Publication No. 2004-227127, environment information for realizing an application program designated by process information is added to such process information being managed by the OS, and the environment information is inherited by the newly created process information.

Moreover, Japanese Patent Laid-Open Publication No. 2005-267327 discloses technology for dynamically migrating virtual file servers in a cluster configured from a plurality of file servers set with virtual file servers. Load balancing in virtual file server units is enabled due to such dynamic migration of the virtual file servers.

In addition, Japanese Patent Laid-Open Publication No. H9-274544 discloses load balancing technology of logical devices. Specifically, in Japanese Patent Laid-Open Publication No. H9-274544, a logical disk device with high access frequency is rearranged in a faster physical disk device.

SUMMARY

With the above-discussed storage systems adopting NAS technology, an administrator refers to system information in a NAS apparatus by operating a NAS management terminal. However, the administrator cannot refer to system information in the storage subsystem because the NAS management terminal is not directly connected to a storage subsystem. Accordingly, the administrator needs to additionally operate a service processor (SVP) provided in the storage subsystem in order to refer to system information in the storage subsystem.

Furthermore, in a NAS apparatus providing VNAS, because the individual VNAS is unable to collect the I/O amount issued to the corresponding logical unit, it is difficult for the administrator to take effective measures to prevent the deterioration in response performance caused by a biased load on a specific logical unit in the storage system.

Thus, an object of the present invention is to provide a storage system capable of reliably collecting system information of both the NAS apparatus and the storage apparatus, organically fusing such system information, and accurately presenting the fused system information to the system administrator.

Another object of the present invention is to provide a storage system for simulating the reconfiguration of a virtual file server and a logical unit for load balancing based on the collected system information.

A further object of the present invention is to provide a storage system capable of reconfiguring the virtual file server and the logical unit according to the result of the reconfiguration simulation.

The present invention has been made in order to achieve the foregoing objects, and is characterized in that a management apparatus collects system information from both the NAS apparatus and the storage apparatus, creates system performance information based on the collected information, and displays such system performance information on the user interface.

According to one aspect of the present invention, provided is a storage system comprising a plurality of NAS apparatuses including a plurality of virtual file servers configured independently and providing the plurality of virtual file servers respectively to a plurality of host apparatuses, a storage apparatus operatively connected to the plurality of NAS apparatuses and including a plurality of drive units in which a plurality of logical units to be accessed by the plurality of virtual file servers are formed and a controller that controls the access by the plurality of virtual file servers to the plurality of logical units, and a management apparatus connected to the NAS apparatus and the storage apparatus and which includes a user interface to a system administrator.

The management apparatus sends a first send request to the plurality of NAS apparatuses for acquiring first management information, receives the first management information sent from the plurality of NAS apparatuses in reply to the first send request, sends a second send request to the controller for acquiring second management information, and receives the second management information sent from the controller in reply to the second send request. The management apparatus creates system performance information concerning the plurality of virtual file servers based on the received first management information and the received second management information, and displays the created system configuration information on the user interface.

Preferably, the management apparatus visually differentiates and displays a specific item of the system performance information according to a threshold value management table defining a threshold value of at least one item of the system performance information.

According to another aspect of the present invention, provided is a method of managing, using a management apparatus, a storage system configured from a plurality of NAS apparatuses capable of forming a plurality of virtual file servers, and a storage apparatus including a plurality of logical units to be accessed by the plurality of virtual file servers and a controller that controls the access to the plurality of logical units.

In the method, the management apparatus sends a first send request for acquiring first management information to the plurality of NAS apparatuses, and in reply to the first send request, each of the plurality of NAS apparatuses sends the first management information to the management apparatus. Further, the management apparatus sends a second send request for acquiring second management information to the controller, and in reply to the second send request, the controller sends the second management information to the management apparatus. As a consequence, the management apparatus creates system performance information concerning the plurality of virtual file servers based on the received first management information and the received second management information, and displays the created system performance information on a user interface thereof.

Preferably, at the displaying step, the management apparatus visually differentiates and displays a specific item of the system performance information according to a threshold value management table defining a threshold value of at least one item of the system performance information.

According to the present invention, it is possible to reliably collect system information of both the NAS apparatus and the storage apparatus, organically fuse such system information, and accurately present the fused system information to the system administrator.

Moreover, according to the present invention, it is possible to easily simulate the reconfiguration of a virtual file server and a logical unit based on the collected system configuration information. The system administrator is thereby able to easily grasp the efficient configuration of the storage system.

In addition, according to the present invention, it is possible to reconfigure the virtual file server and the logical unit according to the result of the reconfiguration simulation. The system administrator is thereby able to operate the storage system effectively.

The other technical features and advantages of the present invention will become apparent from the ensuing embodiments explained with reference to the attached drawings.

DESCRIPTION OF DRAWINGS

FIG. 4 is a diagram showing an example of a NAS head performance management table in the NAS according to an embodiment of the present invention;

FIG. 9 is a diagram showing an example of a controller management table in the storage apparatus according to an embodiment of the present invention;

FIG. 10 is a diagram showing an example of a RAID group unused capacity management table in the storage apparatus according to an embodiment of the present invention;

FIG. 14 is a diagram showing an example of a VNAS performance management table in the management apparatus according to an embodiment of the present invention;

FIG. 15 is a diagram showing an example of an LU performance management table in the management apparatus according to an embodiment of the present invention;

FIG. 16 is a diagram showing an example of a VNAS performance simulation table in the management apparatus according to an embodiment of the present invention;

FIG. 17 is a diagram showing an example of an LU performance simulation table in the management apparatus according to an embodiment of the present invention;

FIG. 18 is a diagram showing an example of a threshold value management table in the management apparatus according to an embodiment of the present invention;

FIG. 19 is a diagram showing an example of a migration management table in the management apparatus according to an embodiment of the present invention;

DETAILED DESCRIPTION

Embodiments of the present invention are now explained with reference to the attached drawings.

(1) Overall Configuration

Figure 1:
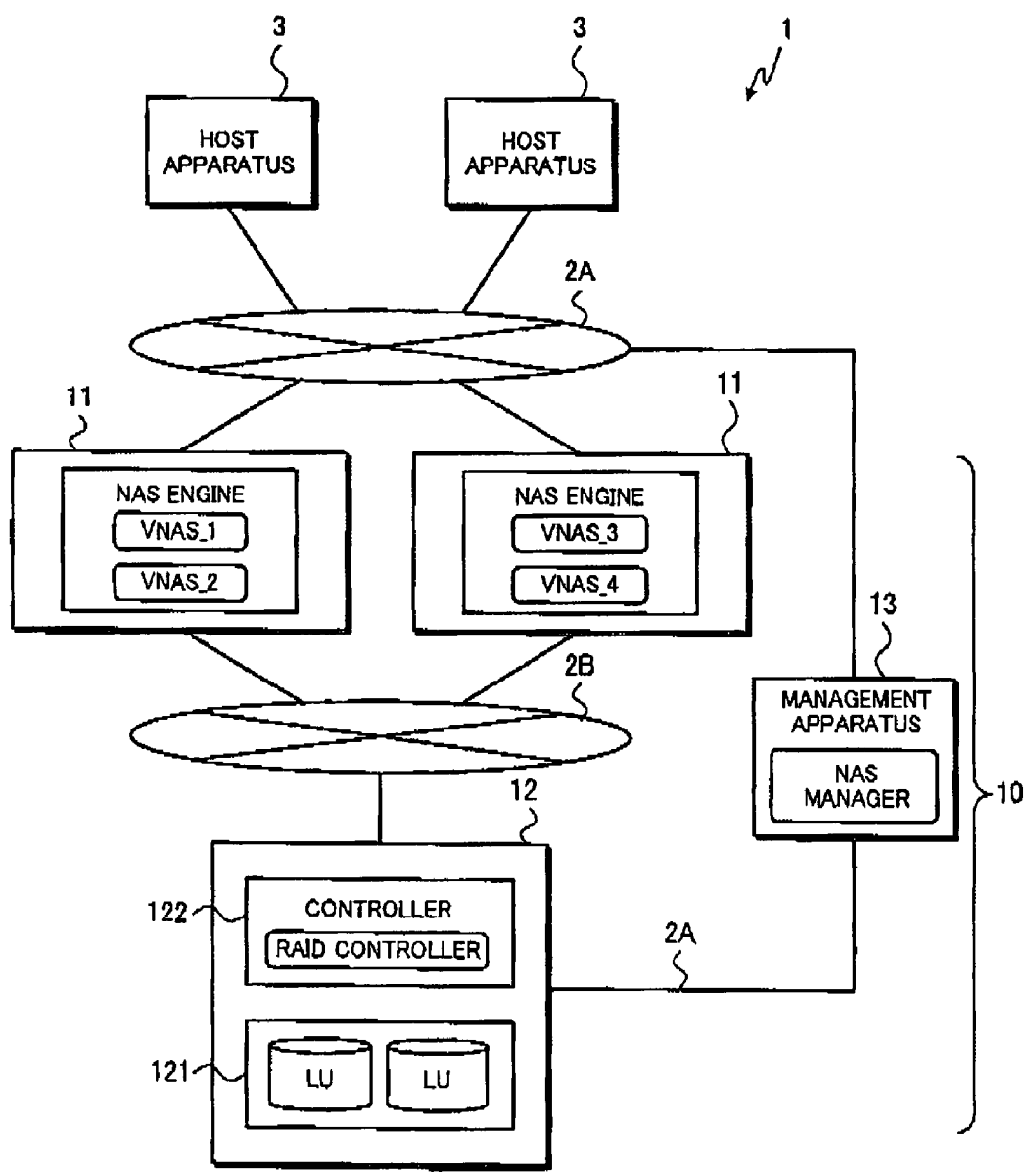
FIG. 1 is a block diagram explaining the schematic configuration of a computer system according to an embodiment of the present invention.

FIG. 1 is a block diagram explaining the schematic configuration of a computer system according to an embodiment of the present invention. As shown in FIG. 1, the computer system 1 comprises one or more NAS apparatuses 11 connected to a host apparatus 3 via a network 2A, and a storage apparatus 12 connected to the NAS apparatus 11 via a network 2B. Namely, connected to the host apparatus 3 via the network 2A is a storage system 10, and thus the host apparatus 3 accesses data in a logical unit LU via the control of the NAS apparatus 11. The storage system 10 includes a management apparatus 13 connected respectively to the NAS apparatus 11 and the storage apparatus 12.

The network 2A is a LAN, the internet or the like. The network 2B is a network known as SAN. In this embodiment, it may be assumed that the network 2A is configured from a TCP/IP protocol based LAN, and the network 2B is configured from a fibre channel protocol based SAN (FC-SAN).

The host apparatus 3 is a computer that achieves desired processing, and is typically a server computer that replies to a processing request given from a client computer (not shown). The host apparatus 3 realizes processing dependent on the request from the client computer by executing various programs in cooperation with hardware resources. For example, the host apparatus 3 I/O accesses the storage apparatus 12 via the NAS apparatus 11 and realizes the desired business system by executing a business application program. The host apparatus 3 typically comprises hardware resources such as a processor, a main memory, a communication interface, and a local I/O device, and further comprises software resources such as a device driver, an operating system (OS), and an application program (not shown).

The NAS apparatus 11 is a file server provided with a NAS engine or NAS head. The NAS engine is a virtual machine realized with various control programs such as a NAS-OS and a file service program executed under the control of the processor. The NAS engine of this embodiment is configured to provide a plurality of virtual NAS environments (VNAS) to the host apparatus.

The storage apparatus 12 comprises an array device 121, which is a physical device (PDEV), and a controller 122 for controlling the I/O access (writing or reading) to the logical unit (LU) in the array device 121, thereby providing data storage service to the host system.

The management apparatus 13 is a terminal device used by a system administrator for managing the storage system 10, and is typically configured from a general-purpose computer. Specifically, the system administrator manages the NAS apparatus 11 and the storage apparatus 12 by operating the various management programs executed in the management apparatus 13. In this embodiment, the management apparatus 13 executes a NAS manager, and thereby allows the system administrator to refer to system performance information regarding the VNAS in the storage system 10 and to perform simulation interactively. In addition, the system administrator uses the management manager to reflect the simulation result in the storage system 10.

Figure 2:
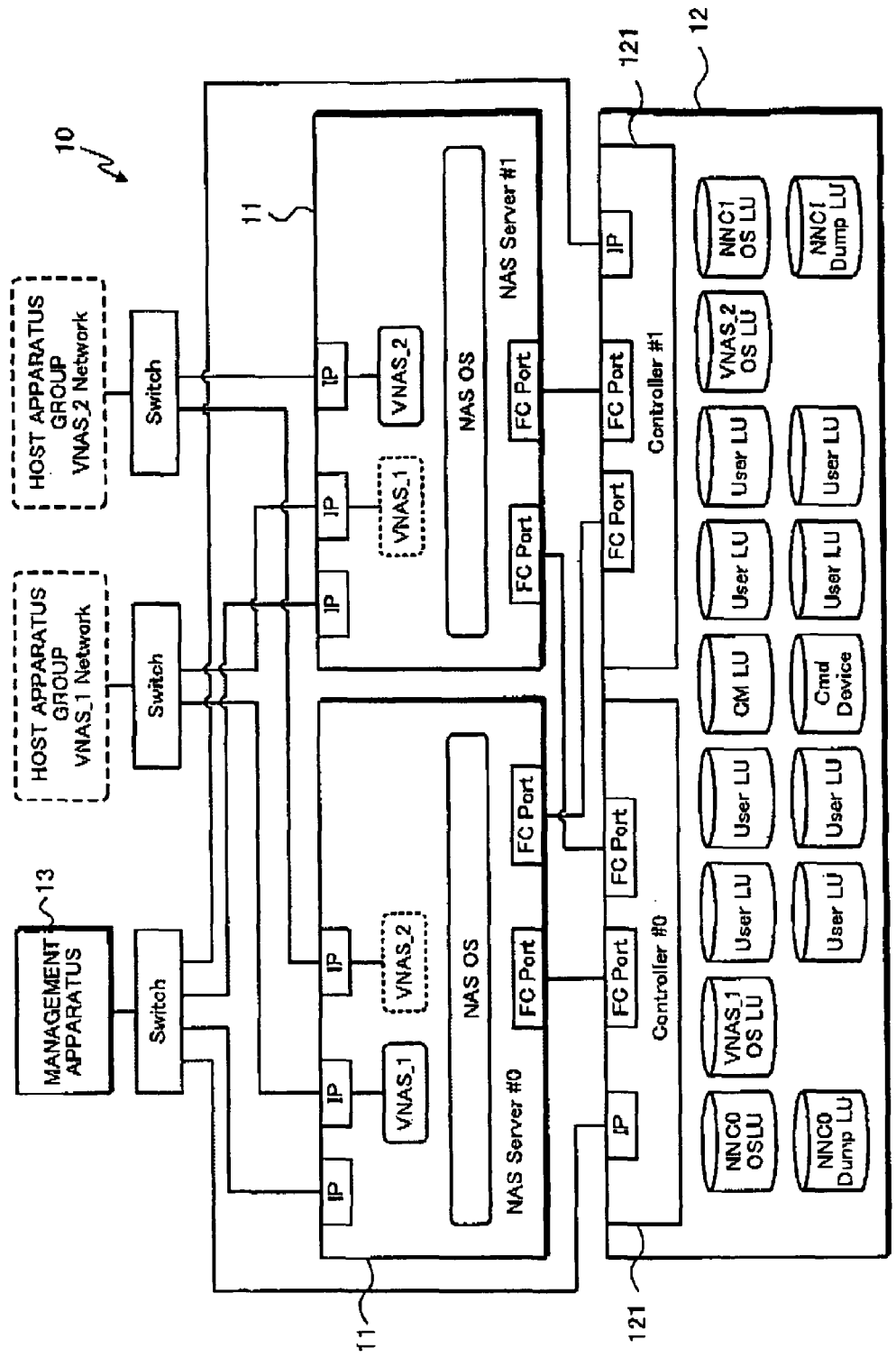
FIG. 2 is a block diagram explaining the outline of VNAS in a storage system according to an embodiment of the present invention.

FIG. 2 is a block diagram explaining the outline of VNAS in the storage system 10 according to an embodiment of the present invention.

As shown in FIG. 2, the NAS apparatus 11 realizes a plurality of virtual file servers (VNAS) on the NAS-OS. Each NAS apparatus 11 may be referred to as a node in NAS architecture. This example illustrates two NAS apparatuses 11.

An identification number (VNAS number) is allocated to each VNAS; however, the same VNAS number will not be allocated even in different NAS apparatuses 11. The VNAS number may be managed in a common logical unit (CM LU) or the like. Each VNAS is controlled to independently communicate with the host apparatus by using an independent IP address.

Each VNAS may share the file systems and files formed in the NAS apparatus 11. The NAS apparatus 11 may perform failover or failback regarding each VNAS. In this embodiment, the NAS apparatus 11 is configured to control the migration of the VNAS between NAS apparatuses 11 under the command of the management apparatus 13.

Each VNAS is operated by using an OS logical unit (OS LU) allocated thereto, and thereby handles one or more user logical units (User LU).

(2) Explanation of NAS Apparatus (2-1) Configuration of NAS Apparatus

Figure 3:
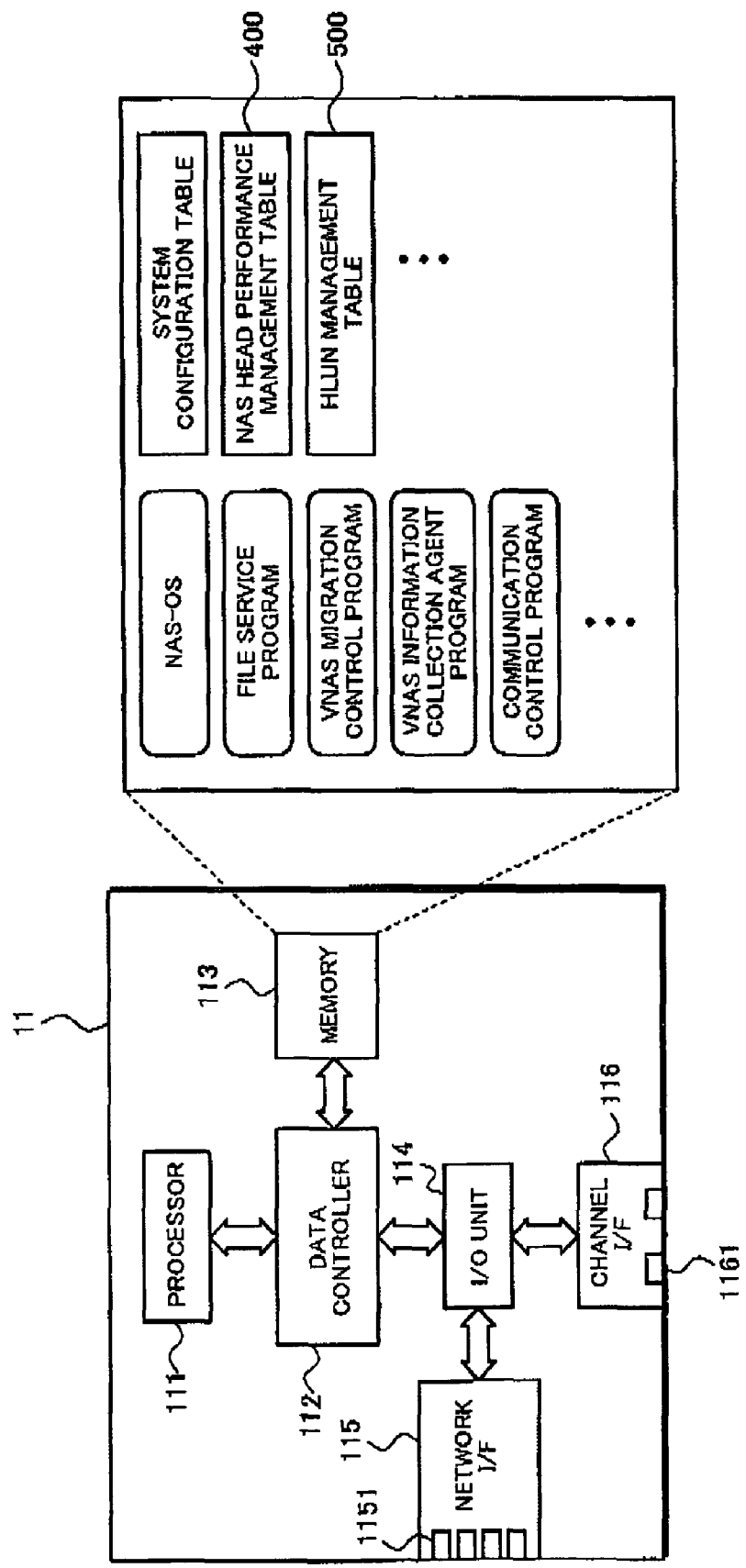
FIG. 3 is a block diagram explaining the configuration of a NAS apparatus according to an embodiment of the present invention.

FIG. 3 is a block diagram explaining the configuration of the NAS apparatus 11 according to an embodiment of the present invention. As shown in FIG. 3, the NAS apparatus 11 comprises a processor (CPU) 111, a data controller 112, a memory 113, an I/O unit 114, a network interface (I/F) 115, and a channel I/F 116.

The processor 111 governs the overall operation of the NAS apparatus 11, and executes the various programs stored in the memory 113 to cause the NAS apparatus 11 to function as a NAS engine including a plurality of VNASes. The processor 111 and the memory 113 are designed to exchange internal data via the data controller 112.

As described above, the basic function of the NAS apparatus 11 is to function as a file server, and realizes a plurality of virtual NAS environments. Accordingly, the processor 111 executes a file service program on a dedicated OS (NAS-OS) and virtually realizes a plurality of file servers. Thus, the memory 113 retains a NAS-OS, a file service program, a VNAS information collection agent program, a communication control program, a VNAS migration program and the like to be used by the processor 111. The memory 113 also retains various types of information including a system configuration table, a NAS head performance management table 400, and an HLUN management table 500 to be referred to by these programs.

The I/O unit 114 is a circuit that governs the I/O control, and connects the network I/F 115 and the channel I/F 116. An expansion I/F for connecting other external board may also be connected to the I/O unit 114.

The network I/F 115 includes a plurality of ports 1151, and is a system circuit that functions as an interface for controlling the communication based on a file access request with the host apparatus 3 connected via the network 2A. The network I/F 115 connects one management apparatus 113 to a plurality of ports 1151, and thereby controls the communication with the management apparatus 13.

The channel I/F 116 includes a port 1161, and is a system circuit that functions as an interface for controlling the communication based on an I/O access request with the storage apparatus 12 connected via the network 2B. The port 1161 is connected to a port of the controller 122 of the storage apparatus 12 described later via a prescribed cable, and thereby forms a path. A pair of paths is formed in correspondence with a pair of controllers 122.

(2-2) Configuration of Tables in NAS Apparatus

FIG. 4 is a diagram showing an example of the NAS head performance management table 400 in the NAS apparatus [11] according to an embodiment of the present invention.

The NAS head performance management table 400 includes the columns of a NAS number 401, a NAS-CPU operating ratio 402, a NAS-memory usage ratio 403, a VNAS number 404, a VNAS-CPU operating ratio 405, a VNAS-memory usage ratio 406, a main/sub path 407, a VNAS-IOPS 408, a controller number 409, and a controller path 410.

The NAS number 401 is a number that is allocated to the NAS apparatus 11 for uniquely identifying the NAS apparatus 11 to execute the NAS-OS. The NAS-CPU operating ratio 402 shows the operating ratio of the processor 11 in the overall NAS apparatus 11. The NAS-memory usage ratio 403 shows the usage ratio of the memory 113 in the overall NAS apparatus 11. In this example, the operating ratio of the processor 111 in the NAS apparatus 11 indicated as "NAS_1" is 55%, and the usage ratio of the memory 113 is 28%.

The VNAS number 404 is a number that is allocated to the VNAS for uniquely identifying the VNAS formed on the NAS-OS in the storage system 10. Accordingly, in the VNAS number [column] 404, the same VNAS number will not be allocated even in different NAS apparatuses 11. The VNAS-CPU operating ratio 405 shows the operating ratio of the processor 111 in relation to each VNAS. The VNAS-memory usage ratio 406 shows the usage ratio of the memory 113 in relation to each VNAS. In this example, the operating ratio of the processor 111 is 40% and the usage ratio of the memory 113 is 20% in relation to the VNAS_1.

The main/sub path 407 shows whether the path to each controller 122 in the storage apparatus 12 is a main path or a sub path. The VNAS-IOPS 408 shows the I/O amount per unit time in the main path and sub path of each VNAS. The controller number 409 is a number that is allocated to the controller 122 for uniquely identifying the controller 122. In this embodiment, "0" and "1" are respectively allocated to the duplicated controllers 122. The controller path 410 is a number that is allocated to the path to the controller 122 of the storage apparatus 12.

Figure 5:
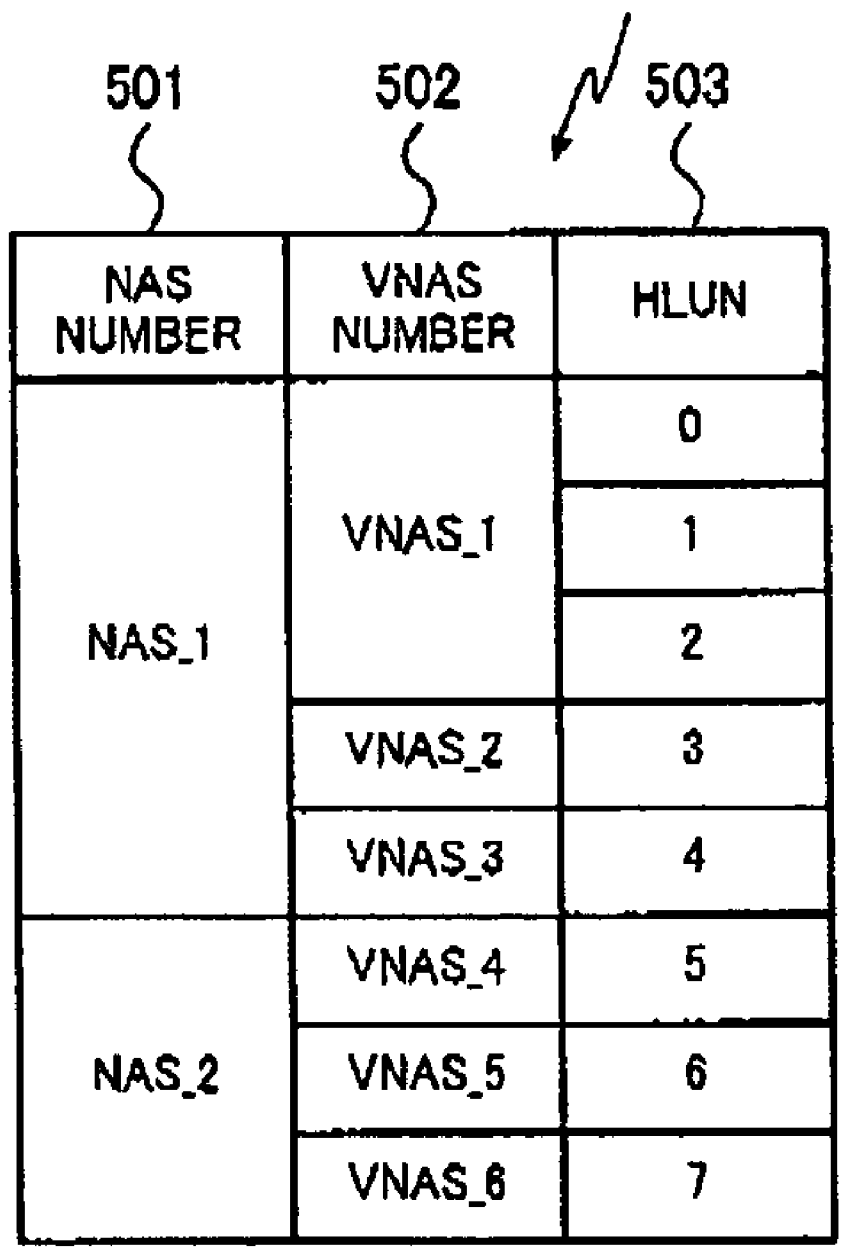
FIG. 5 is a diagram showing an example of an HLUN management table in a NAS management server according to an embodiment of the present invention.

FIG. 5 is a diagram showing an example of the HLUN management table 500 in the NAS management server according to an embodiment of the present invention. The HLUN management table 500 is a table for managing the relationship of the logical unit LU (host logical unit HLU) recognized by the host apparatus 3, and the NAS-OS and the VNAS.

Specifically, as shown in FIG. 5, the HLUN management table 500 includes the columns of a NAS number 501, a VNAS number 502, and an HLUN 503. The NAS number 501 and the VNAS number 502 are the same as those described above. The HLUN 503 is a logical unit number (HLUN) that is allocated to the logical unit (host logical unit) recognized by the host apparatus 3. In this example, HLUN #0 to 2 are allocated to the VNAS_1 of the NAS_1.

(3) Explanation of Storage Apparatus (3-1) Configuration of Storage Apparatus

Figure 6:
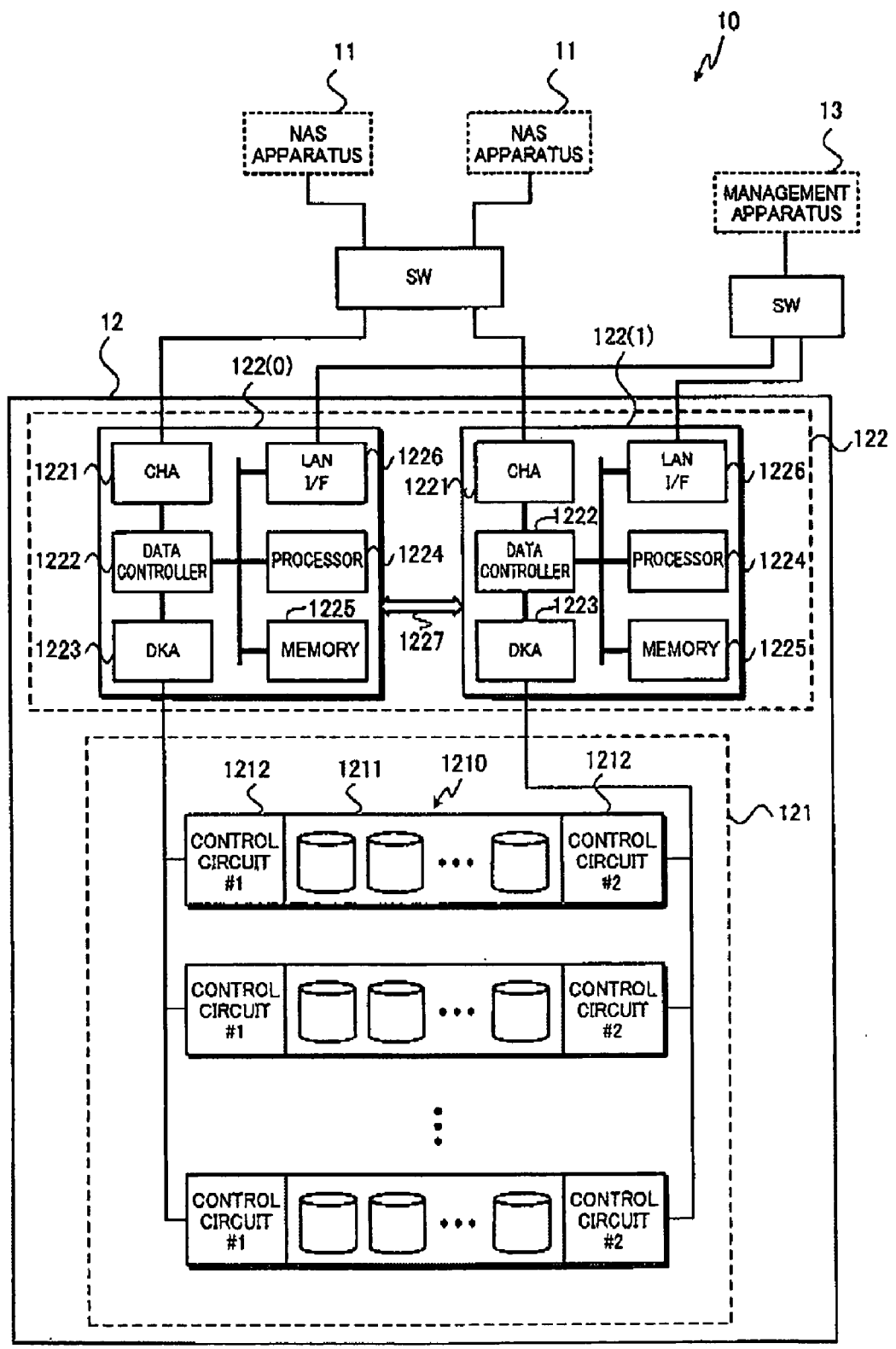
FIG. 6 is a block diagram showing the configuration of a storage apparatus according to an embodiment of the present invention.

FIG. 6 is a block diagram showing the configuration of the storage apparatus 12 according to an embodiment of the present invention. As described above, the storage apparatus 12 comprises an array device 121 and a controller 122, and the storage apparatus 12 of this embodiment adopts a redundant configuration as shown in FIG. 6. Specifically, the controller 122 of the storage apparatus 12 is duplicated, and the path to the hard disk drives in the array device 121 is also duplicated.

The array device 121 is an aggregate of a plurality of drive units 1210 as physical devices (PDEV). Each drive unit 1210 includes, for instance, a plurality of hard disk drives (HDD) 1211 and a control circuit 1212. The physical device may also be a solid state drive (SSD) or the like. One or more logical devices (LDEV) to be provided to the NAS apparatus 11 as the host system under the control of the controller 122 are formed in the array device 121. The logical devices may also be formed in a virtual device (VDEV) (i.e., RAID group), which is a virtual consolidation of several hard disk drives 1211, under RAID control.

The logical device is a logical storage device that can be recognized by the host system, and a logical unit (LU) is associated therewith in this embodiment. Specifically, each logical device is associated with each port of a channel interface in the controller 122 described later, and the host system recognizes the logical device formed in the physical device as a logical unit.

A logical unit number (LUN) is assigned to each logical unit. The logical unit is partitioned into blocks, which are the smallest unit of I/O access, and a logical block address (LBA) is allocated to each block. The NAS apparatus 11 converts a file access request from the host apparatus 3 into an I/O command including a logical address configured from a logical unit number and a logical block address and, by sending this I/O command to the storage apparatus 12, accesses a specific block in a specific logical unit. In this embodiment, the logical unit (HLU) to be recognized by the host apparatus 3 is associated with the logical unit LU in the storage apparatus 12.

The controller 122 is a system component for controlling the overall storage apparatus 12, and its primary role is to execute I/O processing to the array device 121 based on an I/O command from the NAS apparatus 11. The controller 122 also executes processing concerning the management of the storage apparatus 12 based on the various processing requests from the management apparatus 13.

As described above, in this embodiment, the components in the controller 122 are duplicated from the perspective of fault tolerance. In the ensuing explanation, the duplicated controllers 122 are indicated as a 'controller 122(0)' and a 'controller 122(1)' when it is necessary to differentiate such duplicated controllers 122.

The controller 122 includes a channel adapter (CHA) 1221, a data controller 1222, a disk adapter (DKA) 1223, a processor (CPU) 1224, a memory 1225, and a LAN interface 1226. The controllers 122(0) and 122(1) are connected via a bus 1227 to enable mutual communication. Each of the controllers 122(0) and 122(1) may have the same configuration.

The channel adapter 1221 is an interface for connecting the NAS apparatus 11 via the network 2A, and controls data communication according to a prescribed protocol with the host system. When the channel adapter 1221 receives a write command from the host system, it writes the write command and corresponding data in the memory 1225 via the data controller 1222.

The data controller 1222 is an interface between the components in the controller 122, and controls the sending and receiving of data between the components.

The disk adapter 1223 is an interface for connecting the array device 121, and controls data communication according to a prescribed protocol with the array device 121 according to an I/O command from the host system. Specifically, the disk adapter 1223 periodically monitors the memory 1225 and, upon discovering an I/O command in the memory 1225, accesses the array device 121 according to such command.

More specifically, when the disk adapter 1223 discovers a write command in the memory 1225, it accesses the array device 121 in order to destage the data in the memory 1225 designated by the write command to the array device 121 (i.e., prescribed storage area of the hard disk drive 1211). Also, when the disk adapter 1223 discovers a read command in the memory 1225, it accesses the array device 121 in order to stage the data in the array device 121 designated by the read command to the memory 125.

The processor 1224 governs the overall operation of the controller 122 (i.e., the storage apparatus 12) by executing various control programs loaded in the memory 1225. The processor 124 may also be a multi-core processor.

Figure 7:
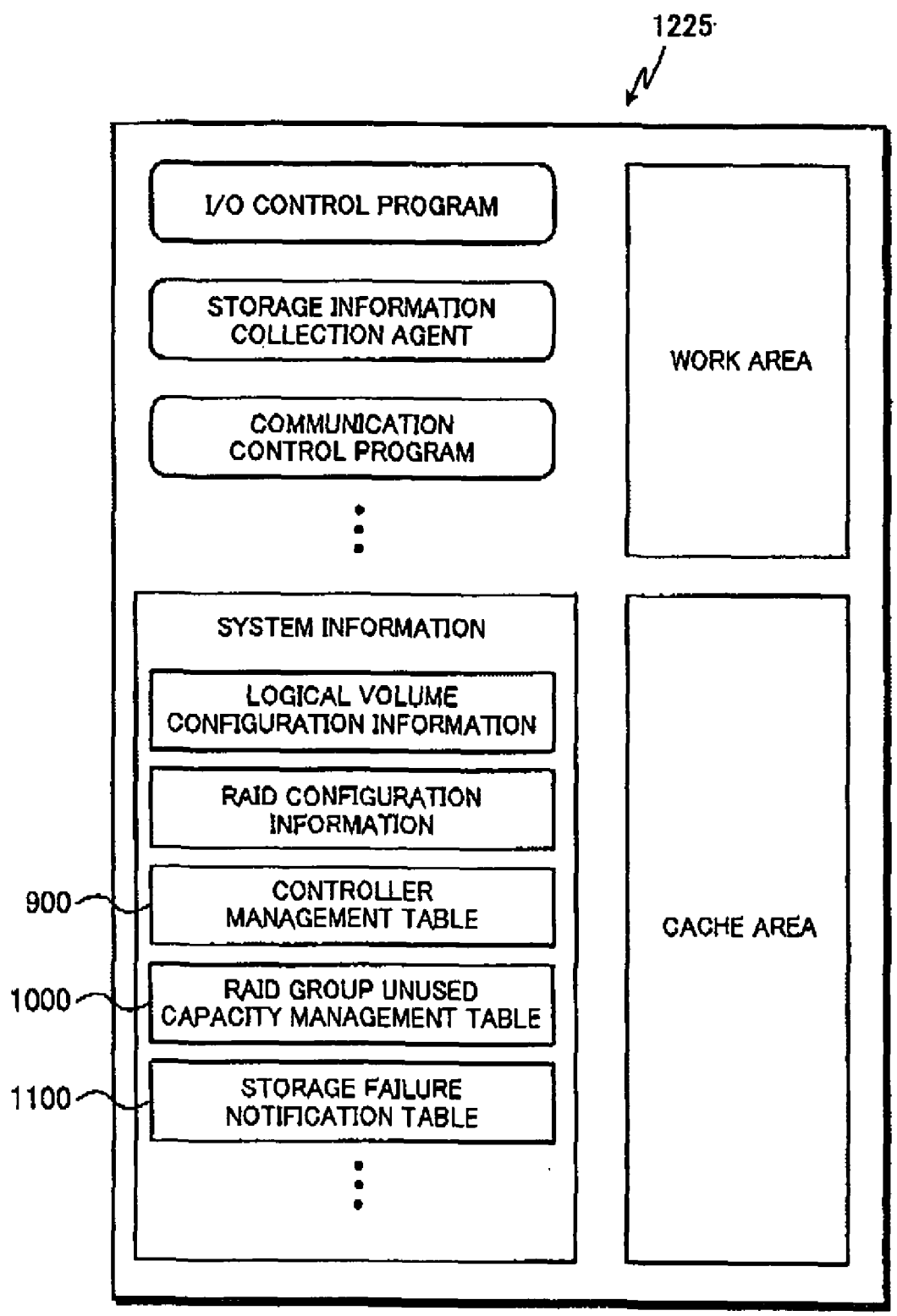
FIG. 7 is a diagram explaining the contents of a memory in a controller of the storage apparatus according to an embodiment of the present invention.

The memory 1225 serves as a main memory of the processor 1224, and also serves as a cache memory of the channel adapter 1221 and the disk adapter 1223. The memory 1225 is configured from a volatile memory such as a DRAM or a nonvolatile memory such as a flash memory. The memory 1225 stores, as shown in FIG. 7, various programs and system information of the storage apparatus 12. In this embodiment, the system information includes, in addition to logical volume configuration information and RAID configuration information, a controller management table 900, a RAID group management table 800, a storage failure notification table 1100, and the like. The system configuration information is read from a specific storage area of the hard disk drive 1211 according to the initial process under the control of the processor when the power of the storage apparatus 1 is turned on, and then loaded in the memory unit 1225.

The system information in the memory 1225 of one controller 122 is transferred to the memory 1225 of the other controller 122 via the bus 1227 under the control of the processor 1224, and the duplicated controllers 122 thereby share the same information.

The LAN interface 1226 is an interface circuit for connecting the management apparatus 4 via the LAN. As the LAN interface, adopted may be a network board according to TCP/IP and the Ethernet (registered trademark).

Figure 8:
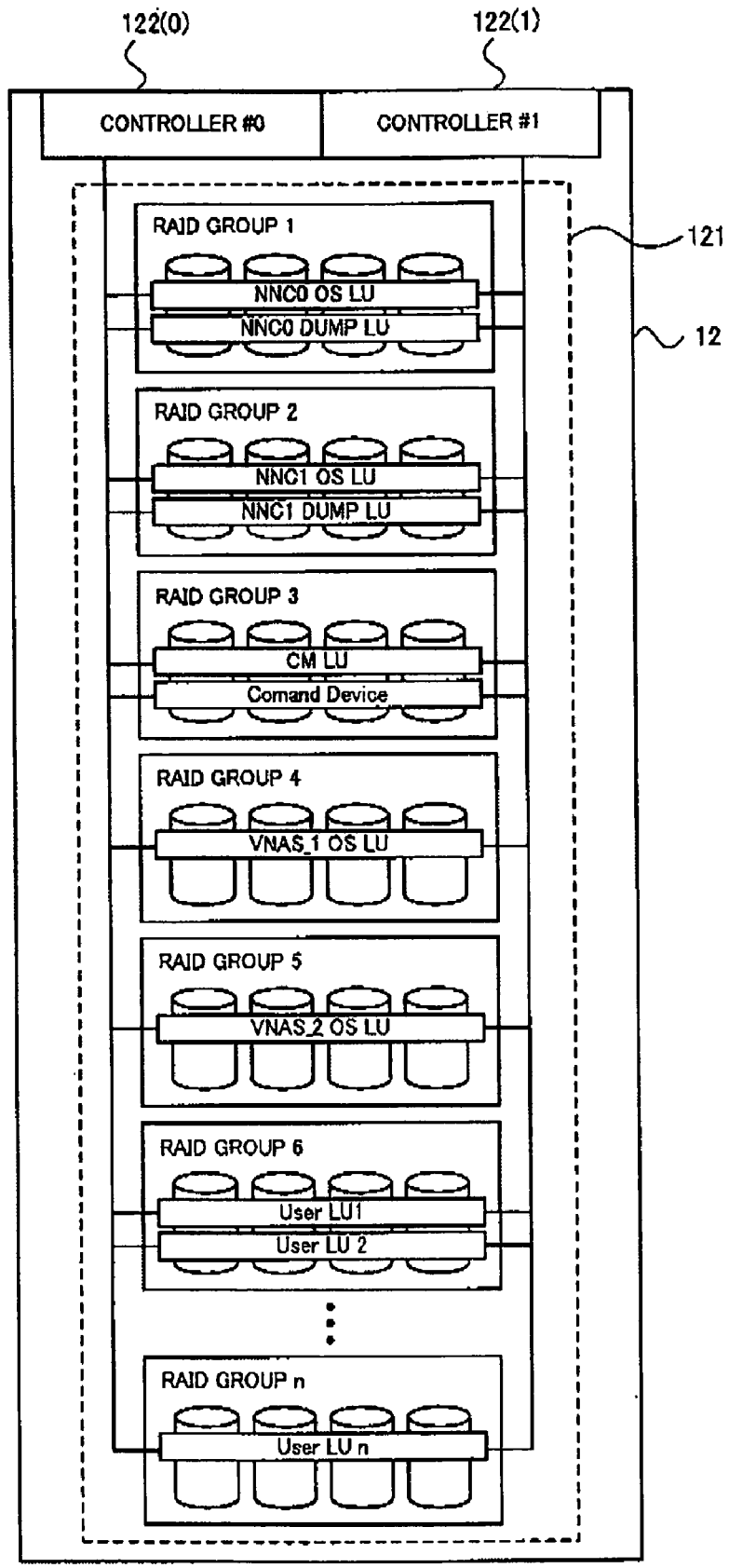
FIG. 8 is a view showing a frame format of a configuration example of a RAID group in the storage apparatus according to an embodiment of the present invention.

FIG. 8 is a view showing a frame format of a configuration example of a RAID group in the storage apparatus 12 according to an embodiment of the present invention. As shown in FIG. 8, the various logical units are formed in a RAID group configured by virtually consolidating several hard disk drives 1211 into a single device. The controller 122 can control the access to the logical units of the respective RAID groups.

(3-2) Configuration of Tables in Storage Apparatus

FIG. 9 is a diagram showing an example of the controller management table 900 in the storage apparatus 12 according to an embodiment of the present invention.

The controller management table 900 includes the columns of a controller number 901, a CPU operating ratio 902, a memory usage ratio 903, a RAID group 904, a RAID level 905, a PDEV capacity 906, a rotating speed 907, a RAID group-IOPS 908, an HLUN 909, a LUN 910, a LUN size 911, and an LU-IOPS 912.

The controller number 901 is a number that is allocated to the respective controllers 122 for uniquely identifying each of the duplicated controllers 122. The CPU operating ratio 902 shows the operating ratio of the processor 1224 in each controller 122. The memory usage ratio 903 shows the usage ratio of the memory 1225 in each controller 122. In this example, the operating ratio of the processor 1224 of the controller 122(0) is 100% and the usage ratio of the memory 1225 is 80%.

The RAID group 904 is a number that is allocated to the hard disk drives 1211 configuring a RAID group, and the RAID level 905 is the RAID level that is set in each RAID group. The PDEV capacity 906 is the total capacity (capacity of virtual devices) of the hard disk drives 1211 configuring the respective RAID groups, and the rotating speed 907 shows the rotating speed per unit time of the hard disk drive 1211. The RAID group-IOPS 908 shows the I/O amount per unit time in each RAID group of each controller 122.

The HLUN 909 is a logical unit number that is allocated to the host logical unit associated with each RAID group. The LUN 910 is a logical unit number that is allocated to an internal logical unit associated with the host logical unit. The LUN size 911 is the logical size of the internal logical unit shown with each LUN. The LU-IOPS 912 shows the I/O amount per unit time in relation to the internal logical unit LU shown with each LUN.

FIG. 10 is a diagram showing an example of the RAID group unused capacity management table [1000] in the storage apparatus 12 according to an embodiment of the present invention.

The RAID group unused capacity management table 1000 is a table formed under RAID control for managing the capacity of unused areas in each RAID group in the storage apparatus 12, and a RAID group 1001 and its unused capacity 1002 are associated.

Figure 11:
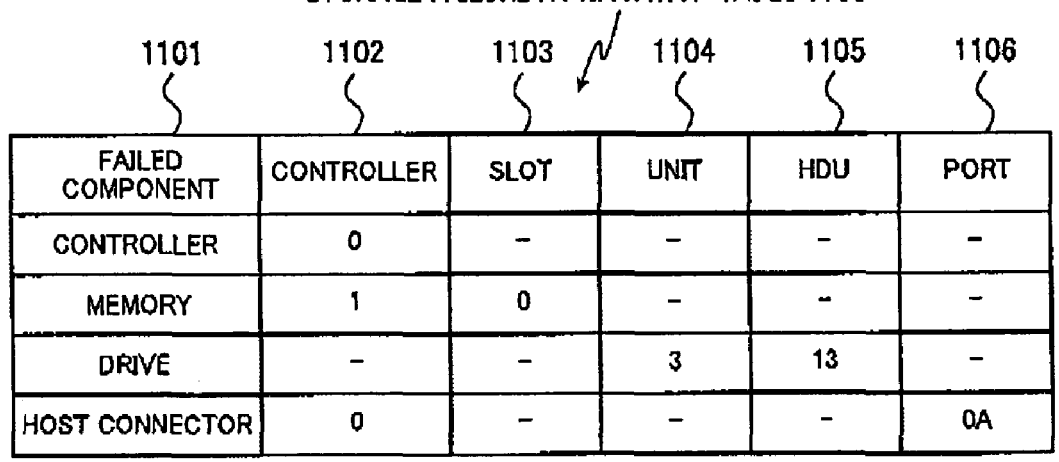
FIG. 11 is a diagram showing an example of a storage failure notification table according to an embodiment of the present invention.

FIG. 11 is a diagram showing an example of the storage failure notification table [1100] in the NAS management server according to an embodiment of the present invention. The storage failure notification table 1100 is a table for managing the failures detected in the components/parts in the storage apparatus 12.

In the storage failure notification table 1100, detailed components 1102 are defined for each entry shown as the component 1101. In FIG. 1, the columns of "controller," "slot," "unit," "HDU," and "port" as shown as the detailed components 1102. For instance, for the "controller" as the component 1101, the number of the failed controller 122 is set in the "controller" column of the detailed component 1102. Moreover, for the "memory" as the component 1101, the number of the controller 122 mounting the failed memory 1225 and the number of the slot used by that memory 1225 are set in each of the corresponding columns. For the "drive" as the component 1101, the number of the failed drive unit 1210 and the HDU number are set in each of the corresponding columns. For the "host connector" as the component 1101, the number of the controller 122 having the failed host connector and the port number are set in each of the corresponding columns.

(4) Explanation of Management Apparatus 13

(4-1) Configuration of Management Apparatus 13

Figure 12:
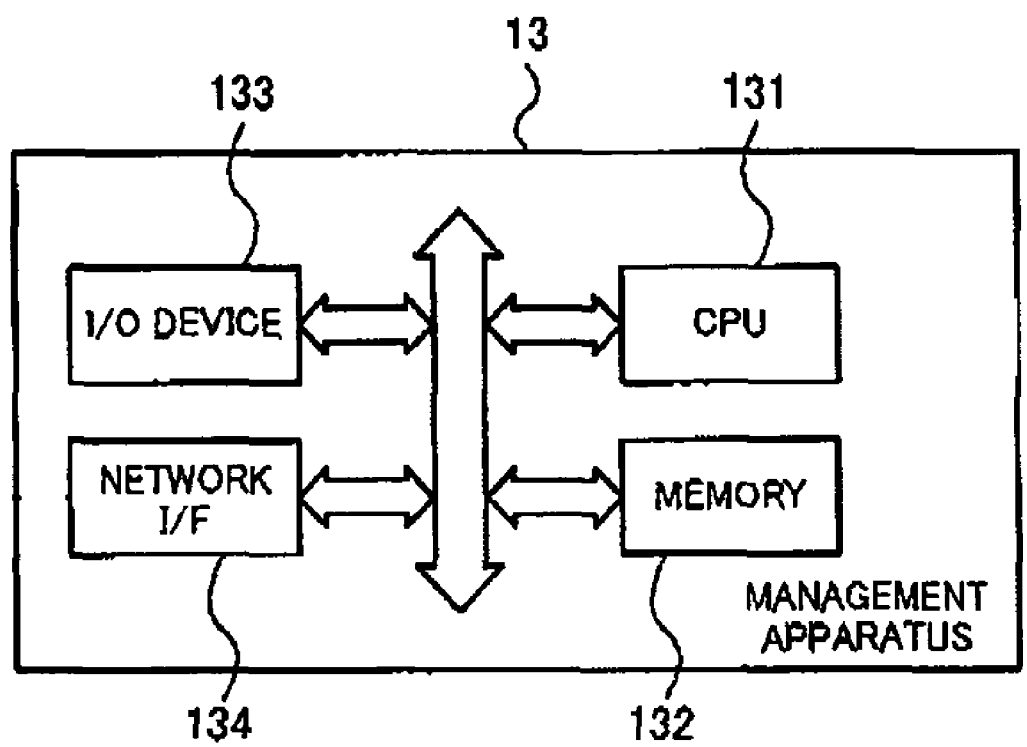
FIG. 12 is a diagram explaining the configuration of a management apparatus according to an embodiment of the present invention.

FIG. 12 is a diagram explaining the configuration of the management apparatus 13 according to an embodiment of the present invention. The management apparatus 13 is typically a general-purpose computer as described above and, therefore, comprises hardware resources such as a processor (CPU) 131, a memory 132, an I/O device 133, and an I/F device 134, and software resources such as an OS and a management program.

Figure 13:
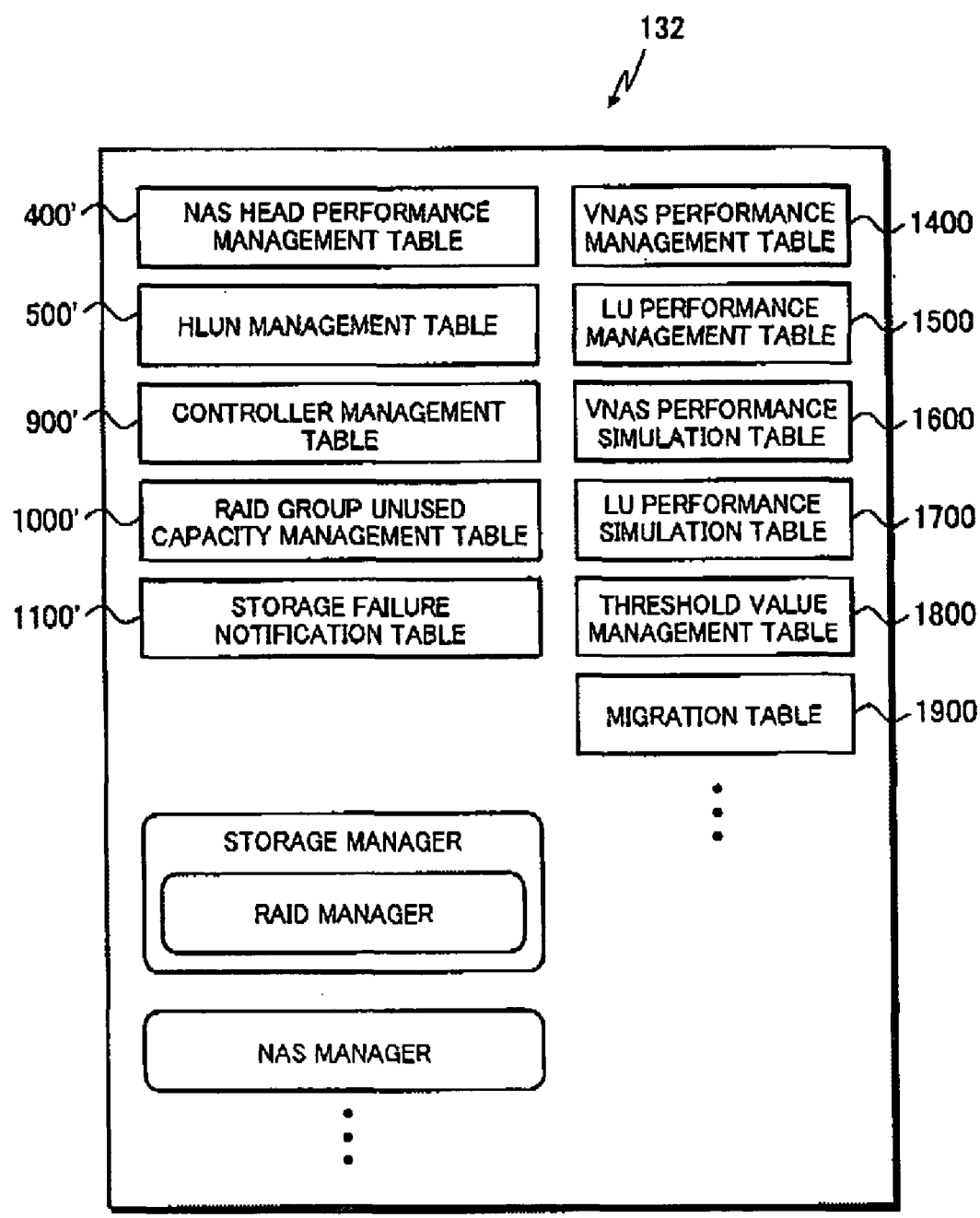
FIG. 13 is a diagram explaining the contents of a memory in the management apparatus according to an embodiment of the present invention.

The processor 131 executes the NAS manager loaded in the memory 132 and provides NAS management tools to the system administrator. Thus, as shown in FIG. 13, the memory 132 retains various management tables in addition to retaining various management programs. Several of the management tables are copies of the tables acquired from the NAS apparatus 11 and the storage apparatus 12.

The I/O device 133 is configured from a keyboard, a pointing device, a display and so on in order to provide a user interface environment to the system administrator. The I/F device 134 functions as an external device; that is, as an interface for controlling the communication with the NAS apparatus 11. The management apparatus 13 is also connected to the storage apparatus 12 via the I/F device 134, and is thereby able to directly manage the storage apparatus 12.

For example, by issuing commands to the disk controller via the user interface provided by the management apparatus 4, the system administrator can acquire and refer to the system configuration information of the storage apparatus 1, and configure or change the system configuration information. Specifically, the system administrator operates the management apparatus 4 to set the logical volumes and virtual volumes as well as set the RAID configuration in accordance with the addition of hard disk drives.

(4-2) Configuration of Tables in Management Apparatus

FIG. 14 is a diagram showing an example of the VNAS performance management table 1400 in the management apparatus 13 according to an embodiment of the present invention. The VNAS performance management table 1400 is a table for managing the system performance information calculated based on the various types of information collected from the NAS apparatus 11 and the storage apparatus 12 by the NAS manager.

As shown in FIG. 14, the VNAS performance management table 1400 includes the columns of a NAS number 1401, a NAS-CPU operating ratio 1402, a NAS-memory usage ratio 1403, a VNAS number 1404, a VNAS-CPU operating ratio 1405, a VNAS-memory usage ratio 1406, a main/sub path 1407, a VNAS-IOPS 1408, a controller number 1409, a controller path 1410, a controller-CPU operating ratio 1411, and a controller-memory usage ratio 1412. Since the VNAS performance management table 1400 is created based on the NAS head performance management table 400 in the NAS apparatus 11, it is common with the NAS head performance management table 400 other than the items of the controller-CPU operating ratio 1411 and the controller-memory usage ratio 1412. The items unique to the VNAS performance management table 1400 are explained below.

The controller-CPU operating ratio 1411 shows the operating ratio of the processor 1224 in the controller 122 used by each VNAS. The controller-memory usage ratio 12 shows the usage ratio of the memory 1225 in the controller 122 used by each VNAS. The controller-CPU operating ratio 11 and the controller-memory usage ratio 12, as described later, are values calculated from the performance of the VNAS in the NAS apparatus 11 and the performance of the controller in the storage apparatus 12.

FIG. 15 is a diagram showing an example of the LU performance management table 1500 in the management apparatus 13 according to an embodiment of the present invention. The LU performance management table 1500 is a table for managing information concerning the logical units created based on various types of information collected from the NAS apparatus 11 and the storage apparatus 12 by the NAS manager.

As shown in FIG. 15, the LU performance management table 1500 includes the items of a RAID group 1501, a RAID level 1502, a RAID group-IOPS 1503, an HLUN 1504, a LUN 1505, a NAS number 1506, a VNAS number 1507, a LUN size 1508, and an LU-IOPS 1509. The LU performance management table 1500 is created based on the controller management table 900 acquired from the storage apparatus 12 by referring to the HLUN management table.

The RAID group 1501 and the RAID level 1502 are common with the corresponding columns in the controller management table 900. The RAID group-IOPS 1503 shows the I/O amount per unit time in each RAID group. Although the RAID group-IOPS 908 of the controller management table 900 is the IOPS in each RAID group of each controller 122, the RAID group-IOPS 1503 is the IOPS in each RAID group in the storage apparatus 12. In other words, the RAID group-IOPS 1503 is to the sum of the IOPS in the RAID groups of the same controller 122.

The HLUN 1504, the LUN 1505, the LUN size 1508, and the LU-IOPS 1509 are also common with the corresponding columns in the controller management table 900. The NAS number 1506 and the VNAS number 1507 are the number that are allocated to the NAS and the VNAS corresponding to the HLUN, and are obtained by referring to the HLUN management table 500.

FIG. 16 is a diagram showing an example of the VNAS performance simulation table 1600 in the management apparatus 13 according to an embodiment of the present invention. Since the VNAS performance simulation table 1600 is used for simulating the VNAS performance information in the storage system 10, the table structure is the same as the VNAS performance management table 1400. In addition, the contents of the VNAS performance simulation table 1600 before the NAS manager executes the simulation are the same as the contents of the VNAS performance management table 1400. FIG. 16 shows the simulation result.

FIG. 17 is a diagram showing an example of the LU performance simulation table 1700 in the management apparatus 13 according to an embodiment of the present invention. Since the LU performance simulation table 1700 is used for simulating the LU performance information in the storage system 10, the table structure is the same as the LU performance management table 1500. The contents of the LU performance simulation table 1700 before the NAS manager executes the simulation are the same as the contents of the LU performance management table 1500. FIG. 17 shows the simulation result.

FIG. 18 is a diagram showing an example of the threshold value management table 1800 in the management apparatus 13 according to an embodiment of the present invention. The threshold value management table 1800 is a table defining the threshold value of the items to be visually differentiated and displayed when the NAS manager is to provide the VNAS performance information and the LU performance information to the system administrator.

As shown in FIG. 18, the threshold value management table 1800 is structured such that a condition 1802 and a threshold value 1803 are given to each configuration item 1801. For example, the "NAS-CPU operating ratio" as a threshold value of "90%." Thus, the NAS manager controls the cells where the NAS-CPU operating ratio 1802 exceeds 90% in the VNAS performance management table 1400 by visually differentiating such cells via the management window as described later. The threshold value of the "RAID group-IOPS" can be set according to the "RAID level," the "PDEV capacity," and the "rotating speed."

The system administrator can operate the user interface of the management apparatus 13 to edit and change the definitional content in the threshold value management table 1800.

FIG. 19 is a diagram showing an example of the migration management table 1900 in the management apparatus 13 according to an embodiment of the present invention. The migration management table 1900 is a table for designating the RAID group of the migration destination of the migration-target logical volume.

Thus, as shown in FIG. 19, a migration-target LU_01 and a migration destination RAID group 02 are associated in the migration management table 1900. The NAS manager updates the contents of the migration management table 1900 according to a migration command of the logical unit from the system administrator in the simulation mode.

(5) Explanation of Processing in Storage System 10

(5-1) System Performance Information Display Processing

Figure 20:
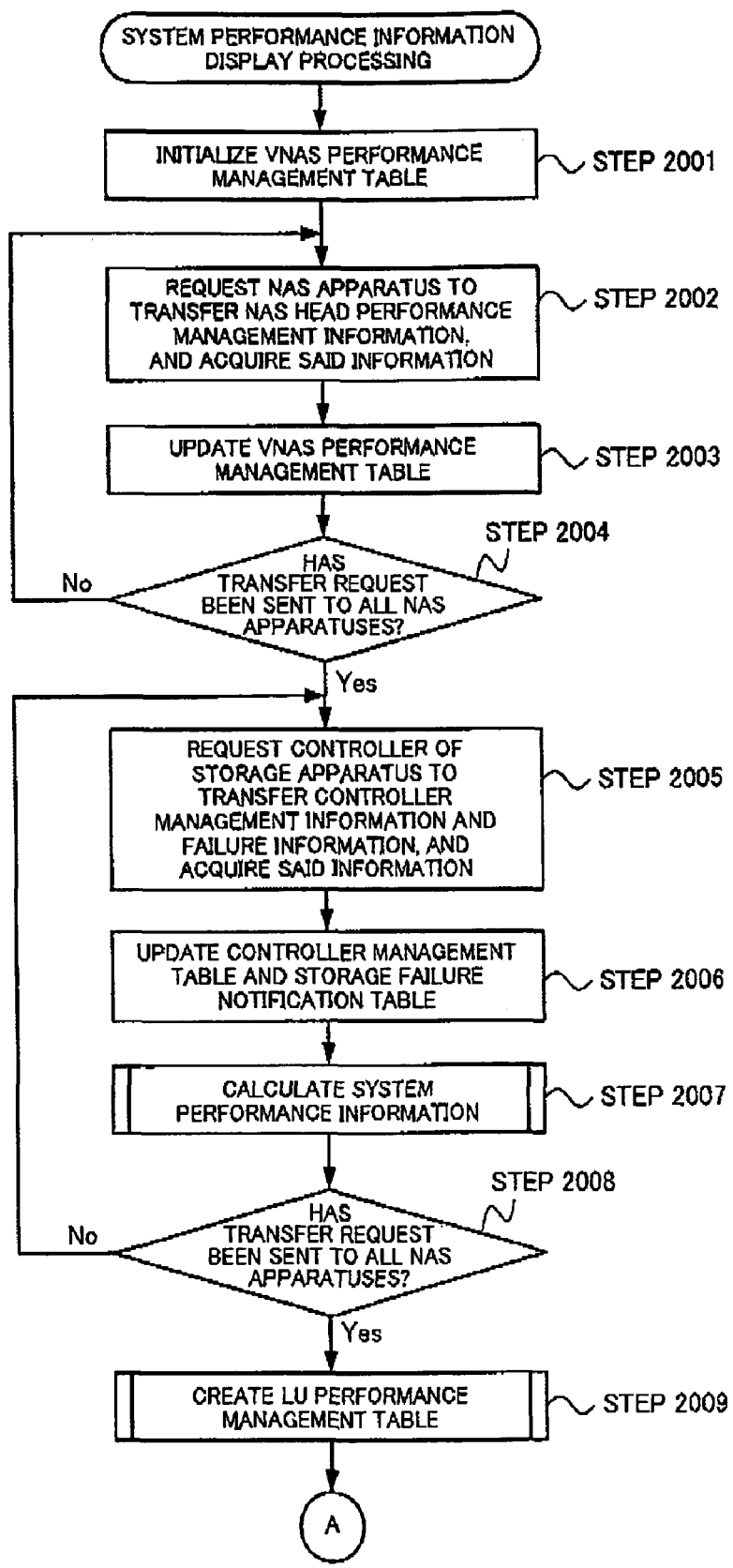
FIG. 20 is a flowchart explaining the system performance information display processing to be performed by the management apparatus according to an embodiment of the present invention.
Figure 21:
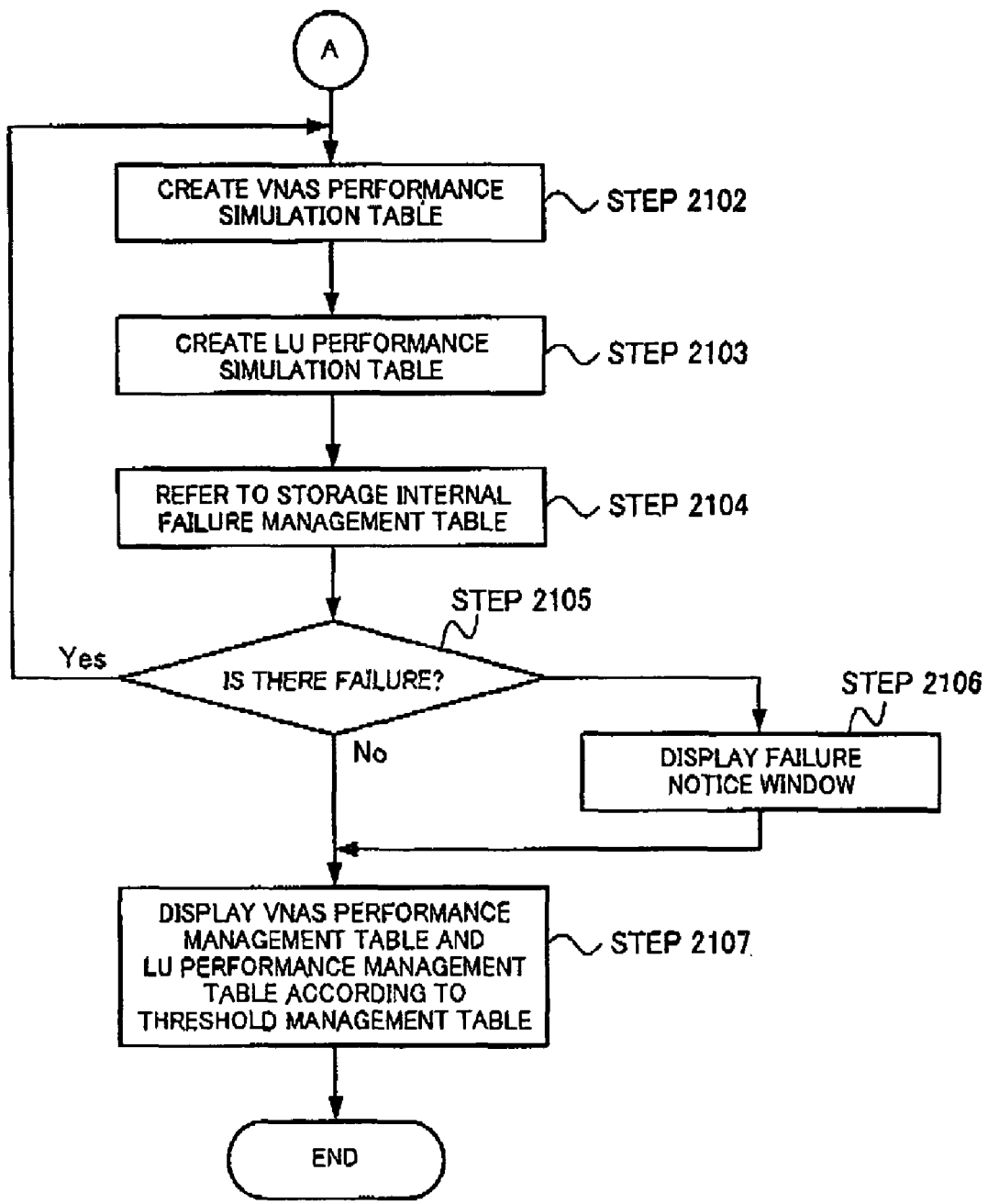
FIG. 21 is a flowchart explaining the system performance information display processing to be performed by the management apparatus according to an embodiment of the present invention.

FIG. 20 and FIG. 21 are flowcharts explaining the system performance information display processing to be performed by the management apparatus 13 according to an embodiment of the present invention. The system performance information is information concerning the system performance that is obtained by mergeing the management information collected from both the NAS apparatus 11 and the storage apparatus 12. The system performance information display processing is executed, for example, by the NAS manager loaded in the management apparatus 13.

Specifically, the system administrator operates the user interface of the management apparatus 13 to boot the NAS manager, and sends a display command of the system performance information to the management apparatus 13. Thereby, the NAS manager foremost initializes the VNAS performance management table 1400 in the memory 132 as shown in FIG. 20 (STEP 2001). The NAS manager newly creates a VNAS performance management table 1400 if a VNAS performance management table 1400 does not exist in the memory 132.

Subsequently, the NAS manager sends a transfer request of NAS head performance management information to one of the NAS apparatus 11 under its control, and acquires the NAS head performance management information sent from the NAS apparatus 11 according to the transfer request (STEP 2002).

Figure 22:
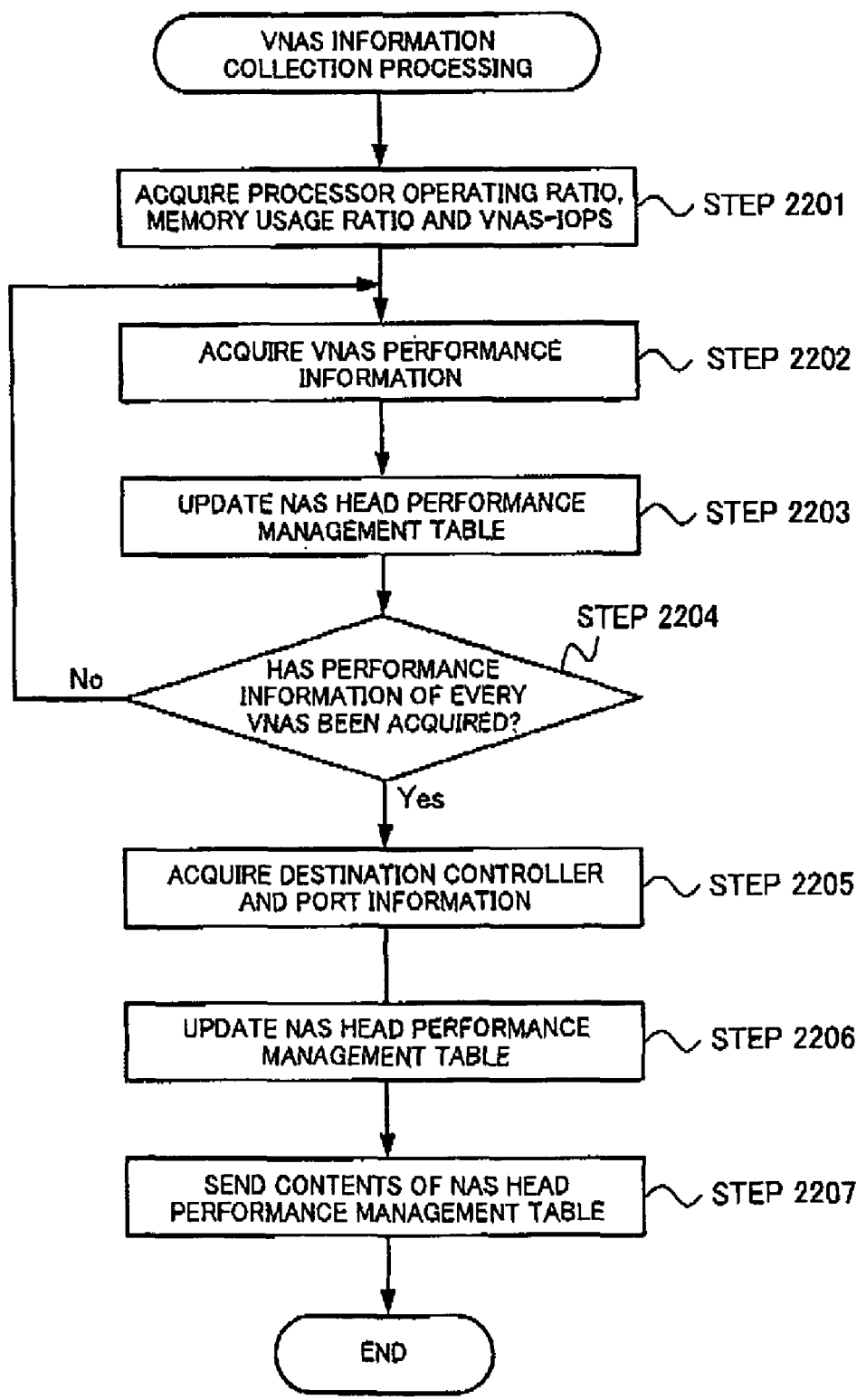
FIG. 22 is a flowchart explaining the VNAS information collection processing to be performed by the NAS apparatus according to an embodiment of the present invention.

FIG. 22 is a flowchart explaining the VNAS information collection processing to be performed by the NAS apparatus 11 according to an embodiment of the present invention. The VNAS information collection processing is executed by the VNAS information collection agent loaded in the NAS apparatus 11. The VNAS information collection agent is called from the NAS-OS by [the NAS apparatus 11] receiving a transfer request of NAS head performance management information from the management apparatus 13.

Referring to FIG. 22, the VNAS information collection agent foremost collects the CPU operating ratio and the memory usage ratio of the self-NAS apparatus 11 (STEP 2201). The foregoing information is obtained by referring to the system property managed by the NAS-OS. Subsequently, the VNAS information collection agent acquires performance information of the VNAS (STEP 2202). The VNAS performance information includes the VNAS-CPU operating ratio, the VNAS-memory usage ratio, and the VNAS-IOPS. The VNAS information collection agent updates the NAS head performance management table 400 based on the acquired information (STEP 2203). The VNAS information collection agent determines whether the VNAS performance information was acquired from every VNAS (STEP 2204). If the VNAS information collection agent determines that a VNAS from which the VNAS information has not been acquired exists (STEP 2204; No), it repeats the foregoing processing until the VNAS information is acquired from every VNAS.

Subsequently, the VNAS information collection agent acquires information concerning the controller 122 connected to the VNAS and information concerning the port 1151 used by the VNAS for connecting to the controller 122 (STEP 2205), and updates the NAS head performance management table 400 based on the acquired controller information and the port information (STEP 2206).

The VNAS information collection agent calls a communication control program for sending the contents of the NAS head performance management table 400 to the management apparatus 13 of the transfer request source (STEP 2207). In response, the communication control program sends the contents of the NAS head performance management table 400 to the management apparatus 13.

Returning to FIG. 20, when the NAS manager acquires the NAS head performance management information from the NAS apparatus 11, it stores the acquired NAS head performance management information in the memory 132 as a NAS head performance management table 400', and additionally updates the VNAS performance management table 1400 based on the acquired NAS head performance management information (STEP 2003).

The NAS manager determines whether the transfer request of NAS head performance management information has been sent to all NAS apparatuses 11 under its control (STEP 2004) and, if the NAS manager determines that a NAS apparatus 11 to which the transfer request of NAS head performance management information has not been sent exists (STEP 2004; No), it repeats the foregoing processing until the transfer request is sent to all NAS apparatuses 11. The NAS manager may also broadcast the transfer request, and acquire in parallel replies (NAS head performance management information) to the transfer request from a plurality of NAS apparatuses 11 under its control.

If the NAS manager determines that the transfer request of NAS head performance management information has been sent to all NAS apparatuses 11 (STEP 2004; Yes), it thereafter sends a transfer request of controller management information and failure information to one of the controllers 122 of the storage apparatuses 12 under its control, and acquires the controller management information and the failure information sent from the controller 122 according to the transfer request (STEP 2005). When the NAS manager acquires the controller management information and the failure information from the controller 122, it respectively updates the storage controller performance management table 900' and the storage failure notification table 1100' in the memory 132 based on the acquired controller management information and the failure information (STEP 2006).

The NAS manager subsequently calculates the system performance information based on the VNAS performance management table 1400 and the controller management table 900' retained in the memory 132 of the management apparatus 13 (STEP 2007). The system performance information includes the controller-to-processor (controller-PU) operating ratio and the controller-to-memory (controller-memory) usage ratio of each VNAS. The calculation processing of the system performance information will be explained later with reference to FIG. 25. The VNAS performance management table 1400 is updated based on the calculation processing of the system performance information.

The NAS manager thereafter determines whether the transfer request of controller performance information and failure information has been sent to all controllers 122 (STEP 2008) and, if it determines that there is a controller 122 to which the transfer request has not been sent (STEP 2008; No), repeats the foregoing processing until the transfer request is sent to all controllers 122. The NAS manager may also broadcast the transfer request, and acquire in parallel replies to the transfer request from the controllers 122 of the storage apparatuses 12 under its control. The NAS manager may also separately send the controller management information transfer request and the failure information transfer request.

If the NAS manager determines that the transfer request of controller management information and failure information has been sent to all controllers 122 (STEP 2008; Yes), it creates an LU performance management table 1500 (STEP 2009). The LU performance management table creation processing will be explained later with reference to FIG. 26.

The NAS manager additionally creates a VNAS performance simulation table 1600 based on the VNAS performance management table 1400 (FIG. 21; STEP 2101), and creates an LU performance simulation table 1700 based on the LU performance management table 1500 (STEP 2102). The contents of the VNAS performance simulation table 1600 and the LU performance simulation table 1700 at this point in time are the same as the contents of the VNAS performance management table 1400 and the LU performance management table 1500.

The NAS manager subsequently refers to the failure notification table 1100' (STEP 2103), and determines whether a failure has occurred in the hard disk drives in the array device 121, or the processor 1224 or memory 1225 in the controller 122 (STEP 2104). If the NAS manager determines, based on the contents of the failure notification table 1100', that a failure in the storage apparatus 12 has occurred (STEP 2104; Yes), it displays a failure notification window on the user interface of the management apparatus 13, and notifies the occurrence of a failure to the system administrator (STEP 2105).

Figure 23:
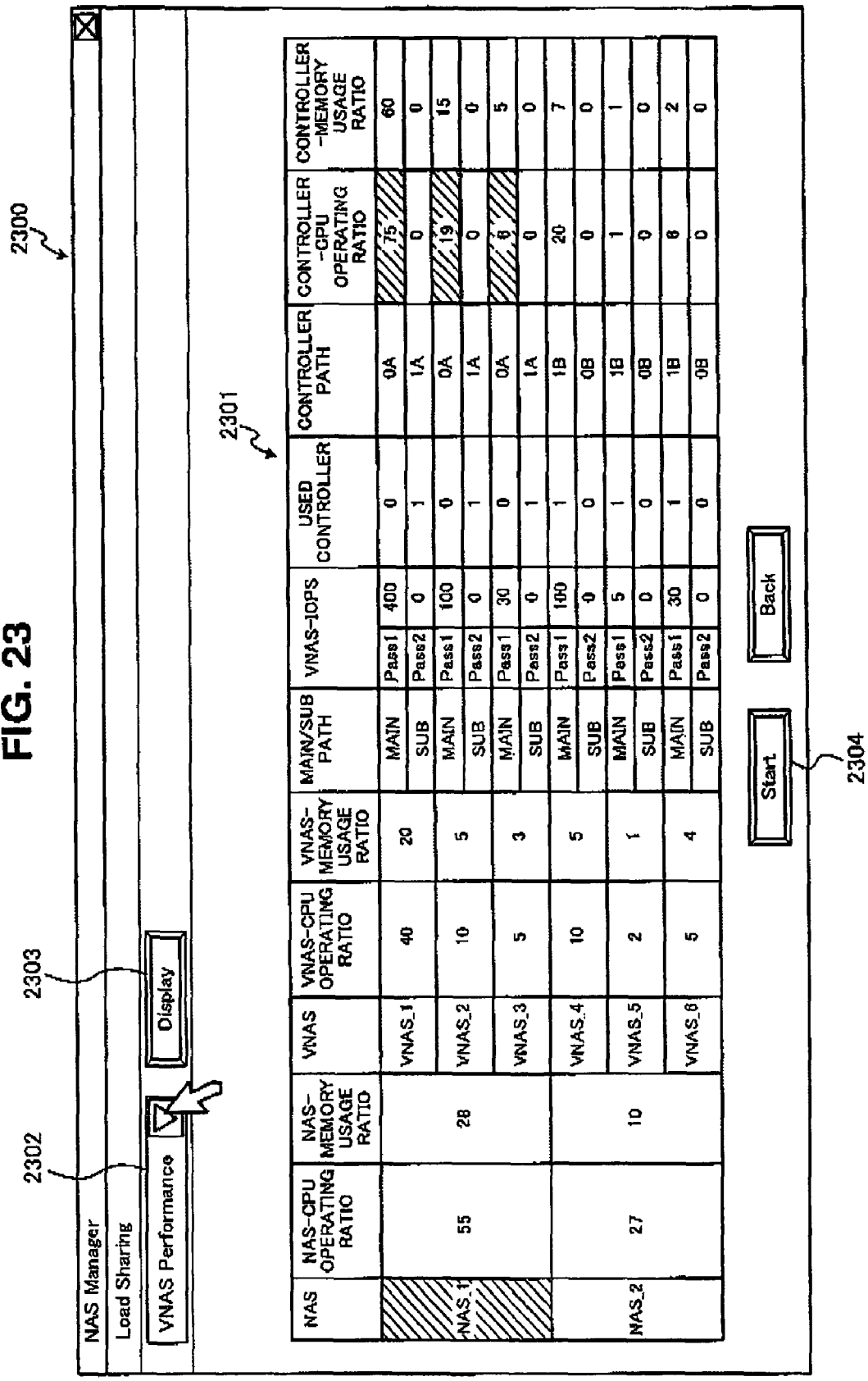
FIG. 23 is a diagram showing an example of a management window displayed on a user interface of the management apparatus according to an embodiment of the present invention.

Meanwhile, if the NAS manager determines that no failure in the storage apparatus 12 has occurred (STEP 2104; No), it provides the VNAS performance management information and the LU performance management information via the management window displayed on the user interface of the management as shown in FIG. 23 and the subsequent drawings according to the VNAS performance management table 1400 and the LU performance management table 1500 (STEP 2106). In this case, the NAS manager refers to the threshold value management table 1800, and provides a decorative effect so that the items exceeding the threshold values set in the threshold value management table 1800 are visually differentiated. The decorative effect may be, for example, coloring or highlighting, or a pop-up message.

Figure 24:
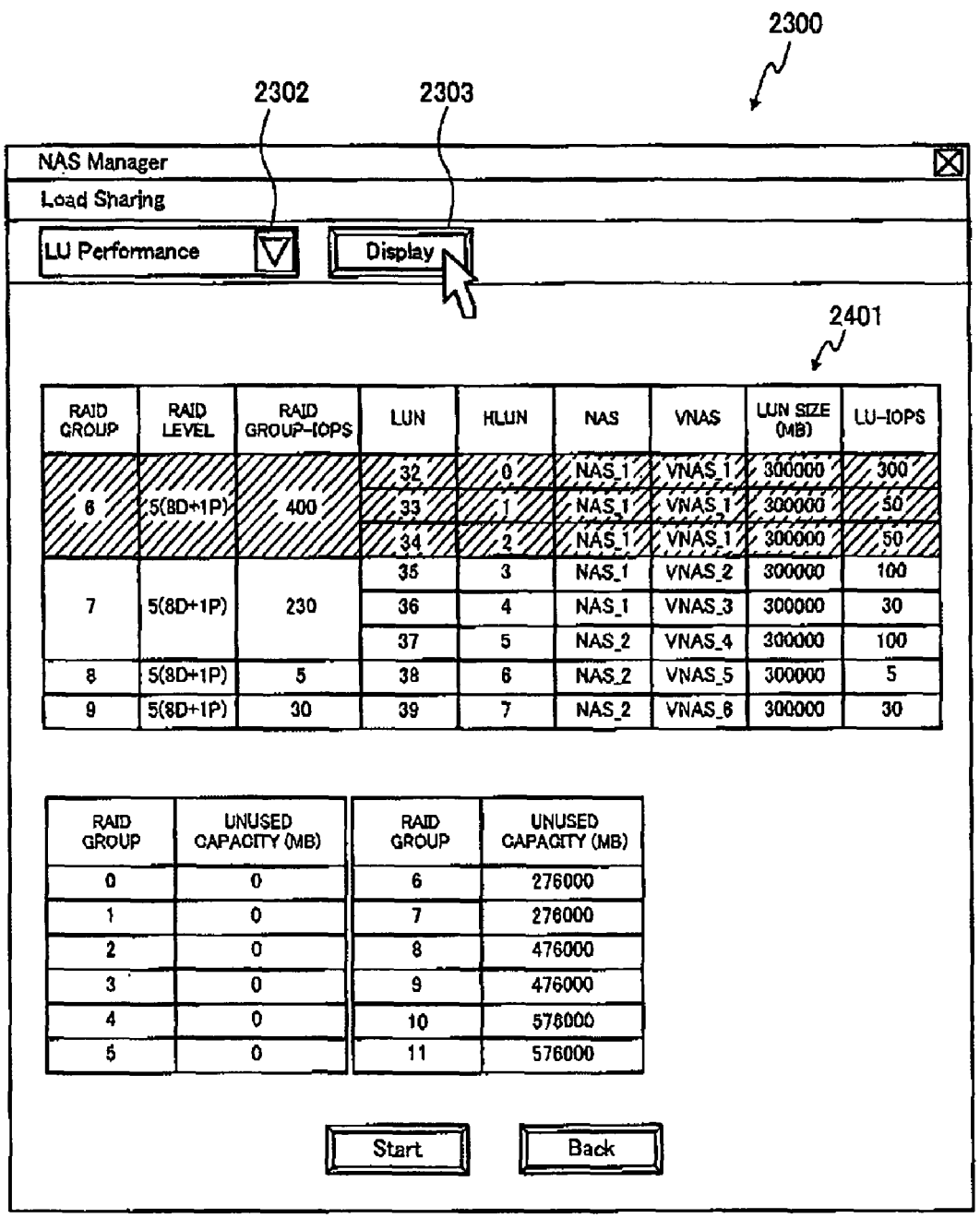
FIG. 24 is a diagram showing an example of a management window displayed on a user interface of the management apparatus according to an embodiment of the present invention.

FIG. 23 is a diagram showing an example of a management window displayed on a user interface of the management apparatus 13 according to an embodiment of the present invention. In this example, the management window 2301 is providing the VNAS performance management information 2301 in table format and, since the controller-CPU operating ratio of the NAS_1 is exceeding the threshold value, this is highlighted in the table (shown with a hatching in FIG. 23). When the system administrator operates the user interface, selects the LU performance management information from the pulldown menu 2302, and presses the display button 2303, the NAS manager provides the LU performance management information in the management window 2301 as shown in FIG. 24. In this example, since the RAID-IOPS is exceeding the threshold value in RAID group "6," this is highlighted in the table.

By way of this, the system administrator can easily confirm the system performance information of the overall storage system 10 including the system performance of the storage apparatus 12 for each VNAS.

(5-2) System Performance Information Calculation Processing

Figure 25:
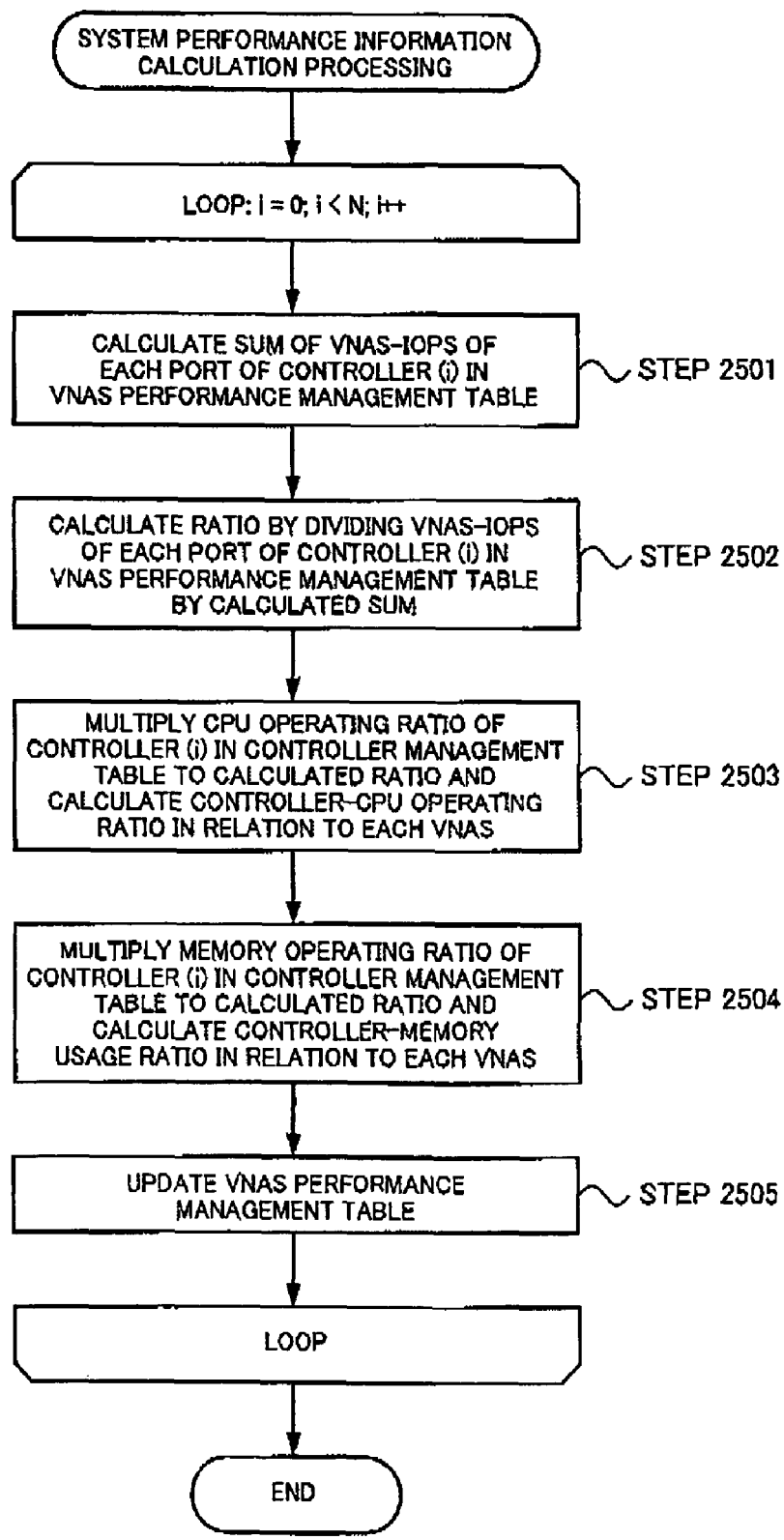
FIG. 25 is a flowchart explaining the system performance information calculation processing to be performed by the management apparatus according to an embodiment of the present invention.

FIG. 25 is a flowchart explaining the system performance information calculation processing to be performed by the management apparatus 13 according to an embodiment of the present invention.

As shown in FIG. 25, the system performance information is calculated regarding the respective controllers 122 provided to the storage apparatus 12 (i.e., in this embodiment, two (N=2) controllers 122[$i$] ($i$=0, 1).

Specifically, the NAS manager calculates the sum of the VNAS-IOPS in each port of the controller 122($i$) shown with the controller number "i" in the VNAS performance management table 1400 (STEP 2501). The NAS manager subsequently divides the VNAS-IOPS in each port of the controller 122($i$) in the VNAS performance management table 1400 by the calculated sum to calculate the ratio (STEP 2502).

Subsequently, the NAS manager multiplies the processor operating ratio of the controller 122($i$) in the controller management table 900' to the calculated ratio to calculate the controller-CPU operating ratio in relation to each VNAS (STEP 2503). Further, the NAS manager multiplies the memory usage ratio of the controller 122($i$) in the controller management table 900 to calculate the controller-memory usage ratio in relation to each VNAS (STEP 2504).

The NAS manager updates the VNAS performance management table 1400 based on the system performance information obtained regarding the controller 122($i$) (STEP 2505).

For instance, let it be assumed that the NAS manager acquired a copy of the NAS head performance management table 400 shown in FIG. 4 from the NAS apparatus 11, and acquired a copy of the controller management table 900 shown in FIG. 9 from the storage apparatus 12.

The NAS manager foremost adds the values of every VNAS-IOPS of the VNAS-IOPS with the controller number "0."

$$400+100+30+0+0+0=530$$

Subsequently, the NAS manager divides the value of the VNAS-IOPS in each port by the obtained value. For instance, in the case of the VNAS_1:

$$400/530=0.75.$$

Subsequently, since the CPU operating ratio of the controller 122(0) is 100%, the NAS manager deems the CPU operating ratio regarding the VNAS_1 to be;

$$0.75 \times 100 = 75.$$

Moreover, since the memory usage ratio of the controller 122(0) is 80%, the NAS manager deems the memory usage ratio regarding the VNAS_1 to be;

$$0.75 \times 80 = 60.$$

By way of this, the VNAS performance management table 1400 as shown in FIG. 14 is obtained, and the VNAS performance management table 1400 is presented via the management window 2300 as shown in FIG. 23.

(5-3) LU Performance Management Table Creation Processing

Figure 26:
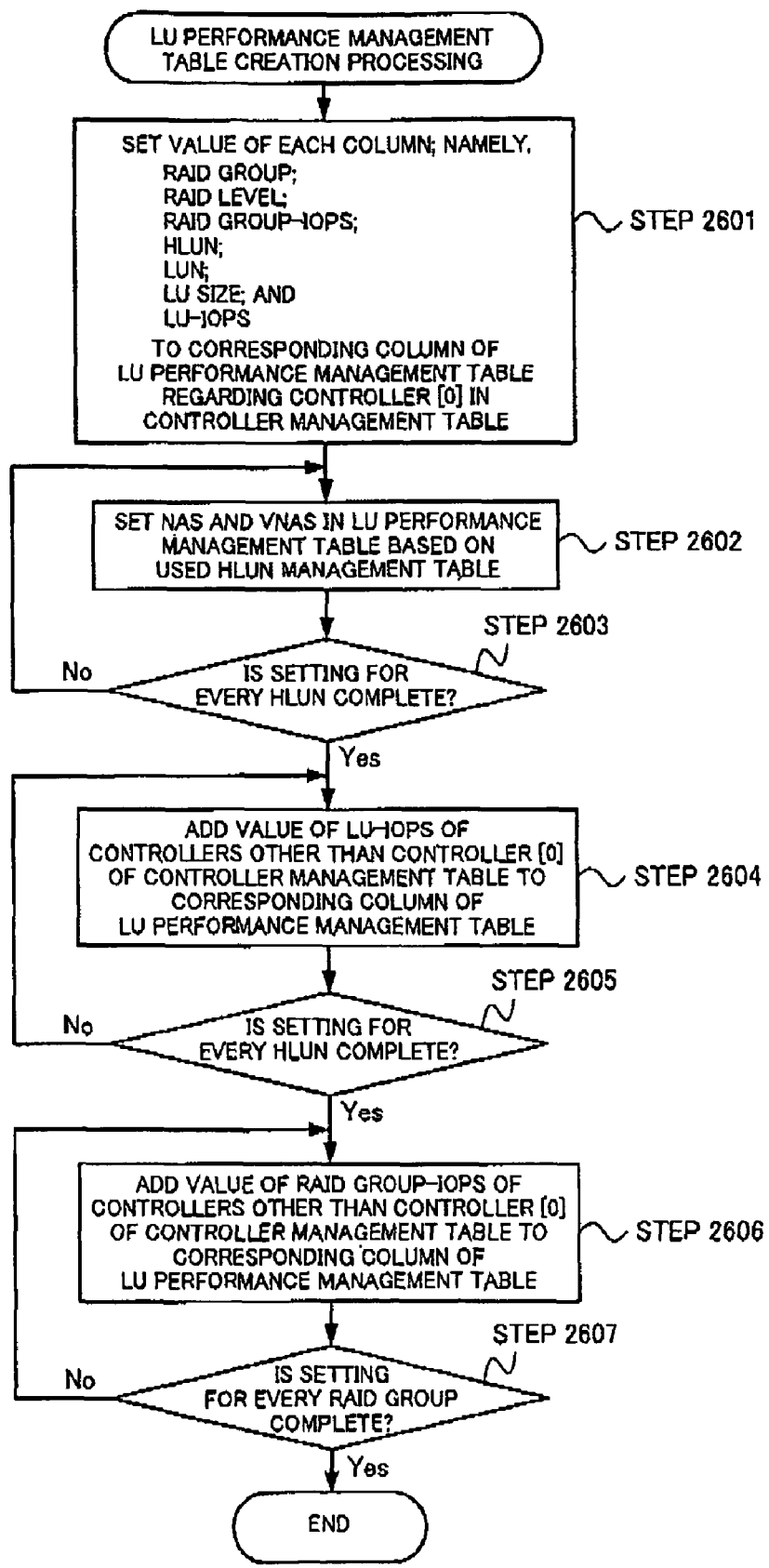
FIG. 26 is a flowchart explaining the LU performance management table creation processing to be performed by the management apparatus according to an embodiment of the present invention.

FIG. 26 is a flowchart explaining the LU performance management table creation processing to be performed by the management apparatus 13 according to an embodiment of the present invention.

As shown in FIG. 26, the NAS manager sets the values of the respective columns of RAID group, RAID level, RAID group-IOPS, HLUN, LUN, LU size, and LU-IOPS regarding the controller 122(0) in the controller management table 900' in the corresponding columns of the LU performance management table 1500 (STEP 2601).

The NAS manager subsequently refers to the HLUN management table 500, and sets the corresponding items of the LU performance management table 1500 so that the NAS and VNAS are associated with each HLUN (STEP 2602). The NAS manager repeats the foregoing processing until the NAS and VNAS are associated with every HLUN (STEP 2603).

The NAS manager thereafter adds the value of the LU-IOPS of the controllers 122(i+1) other than the controller 122(0) of the controller management table to the corresponding column of the LU performance management table 1500 (STEP 2604). Similarly, the NAS manager repeats the foregoing processing until the value of the LU-IOPS regarding every HLUN has been added (STEP 2605).

The NAS manager also adds the value of the RAID group-IOPS of the controllers 122(i+1) other than the controller 122(0) of the controller management table to the corresponding column of the LU performance management table (STEP 2606). The NAS manager repeats the foregoing processing until the value of the RAID group-IOPS regarding every RAID group has been added (STEP 2607).

By way of this, the LU performance management table 1500 shown in FIG. 15 is obtained, and the LU performance information shown in FIG. 24 is displayed.

(5-4) Simulation Processing

The simulation of system performance is performed by the system administrator simulatively changing the system configuration in the storage system 10 via the management window 2300.

Figure 27:
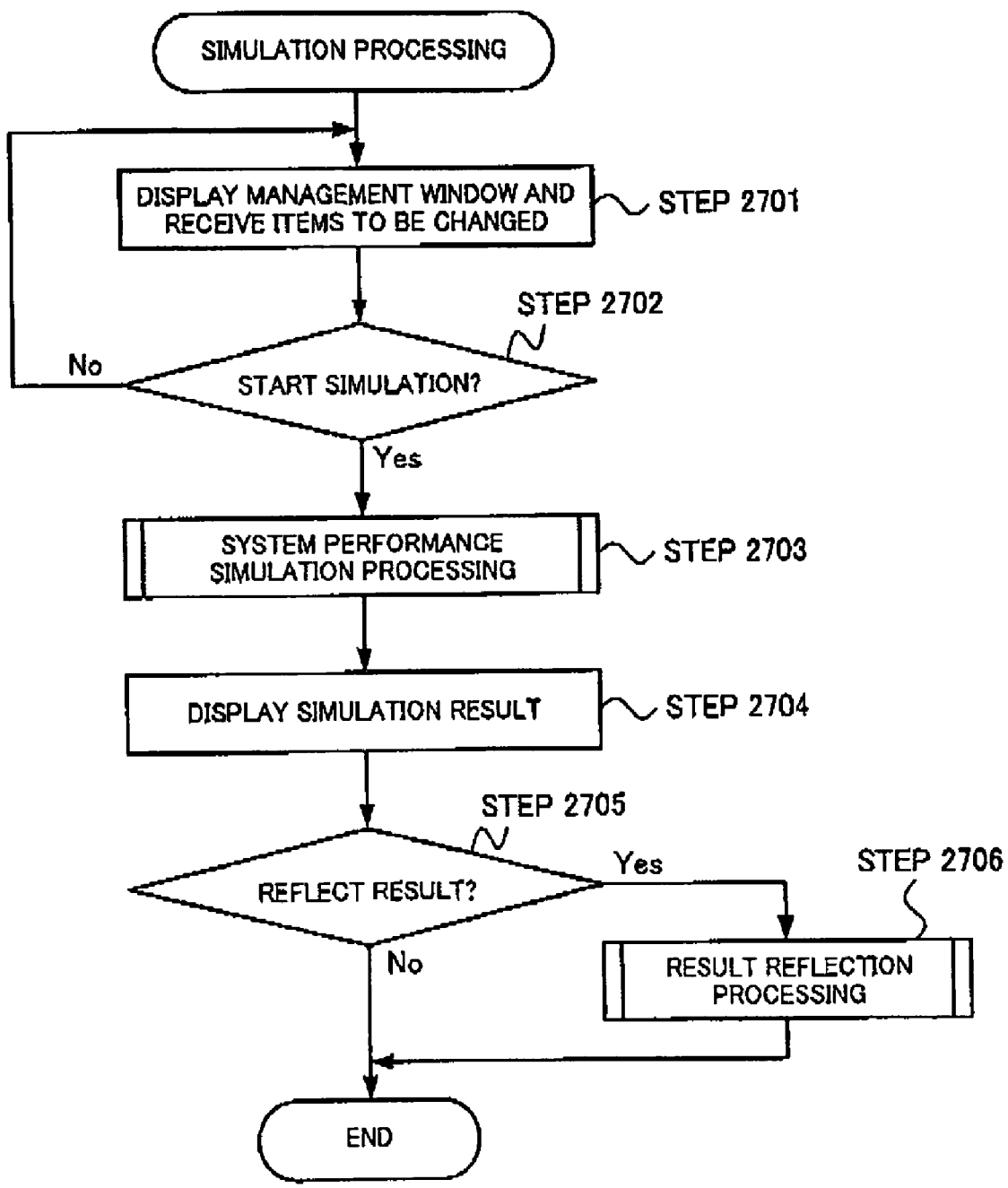
FIG. 27 is a flowchart explaining the simulation processing to be performed by the management apparatus according to an embodiment of the present invention.

FIG. 27 is a flowchart explaining the simulation processing to be performed by the management apparatus 13 according to an embodiment of the present invention. Prior to the simulation processing, the system administrator operates the management window 2300 to change the mode to the simulation mode, and thereafter selects items for setting the simulation conditions.

Specifically, as shown in FIG. 27, the NAS manager receives the items to be simulatively changed (moved) in the storage system 10 via the management window 2300 (STEP 2701), and waits for a simulation start command (STEP 2702). When the NAS manager receives the simulation start command (STEP 2702; Yes), it starts the system performance simulation processing (STEP 2703), and displays the simulation result in the management window 2300 (STEP 2704). Upon displaying the simulation result, if there are items that exceed the threshold value, the NAS manager also displays such items so that they can be visually differentiated.

When the system administrator wishes to reflect the simulation result displayed in the management window 2300 in the storage system 10, the system administrator issues a reflection command via the management window 2300.

When the NAS manager receives a simulation result reflection command via the management window 2300 (STEP 2705), it performs the simulation result reflection processing and updates the system configuration in the storage system 10 (STEP 2706).

Figure 28:
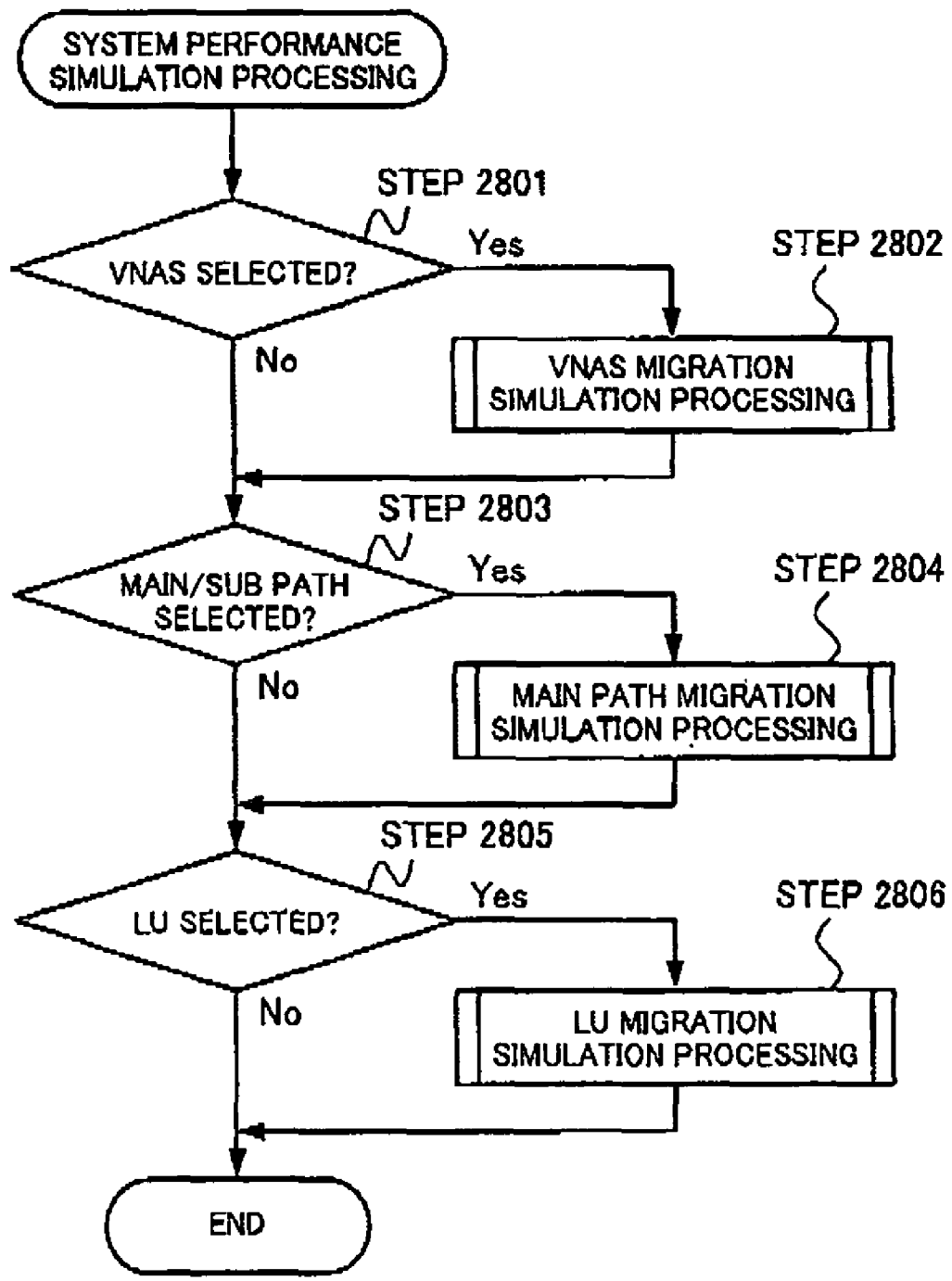
FIG. 28 is a flowchart explaining the simulation processing to be performed by the management apparatus according to an embodiment of the present invention.

FIG. 28 is a flowchart explaining in detail the processing at STEP 2703 in FIG. 27. As shown in FIG. 28, the NAS manager executes the simulation processing for each item that was selected to be changed. Specifically, the NAS manager foremost determines whether a VNAS has been selected to be changed (STEP 2801) and, if it determines that a VNAS has been selected (STEP 2801; Yes), executes the VNAS migration simulation processing (STEP 2802).

The NAS manager also determines whether a main/sub path has been selected to be changed (STEP 2803). If the NAS manager determines that a main/sub path has been selected (STEP 2803; Yes), it executes the main/sub path migration simulation processing (STEP 2804).

The NAS manager further determines whether a logical unit has been selected to be changed (STEP 2805). If the NAS manager determines that a logical unit has been selected (STEP 2805; Yes), it executes the LU migration simulation processing (STEP 2806).

Figure 29:
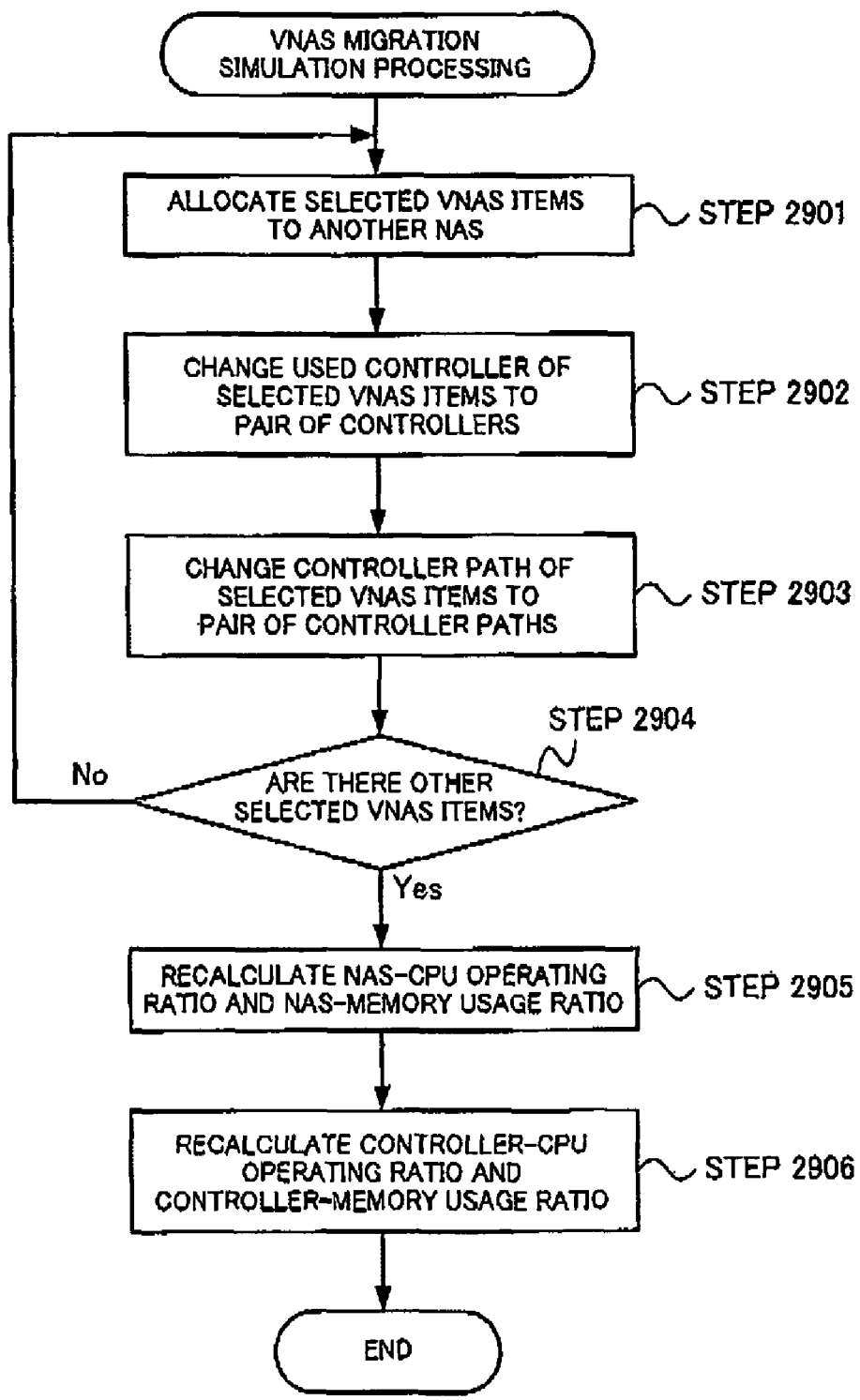
FIG. 29 is a flowchart explaining in detail the VNAS migration simulation processing to be performed by the management apparatus according to an embodiment of the present invention.

FIG. 29 is a flowchart explaining in detail the VNAS migration simulation processing to be performed by the management apparatus 13 according to an embodiment of the present invention.

Specifically, as shown in FIG. 29, the NAS manager allocates the VNAS items and other related items selected by the system administrator in the VNAS performance simulation table 1600 to the NAS apparatuses 11 other than the NAS apparatus 11 to which the selected VNAS belongs (STEP 2901). Subsequently, the NAS manager changes the controller number 1609 of the selected VNAS to the controller number of a pair of controllers 122 (STEP 2902). Moreover, the NAS manager changes the controller path 1609, of the selected VNAS to a pair of controller paths (STEP 2903). For example, the controller paths are formed in pairs of "0A" and "1A," "0B" and "1B," and so on.

The NAS manager determines whether there are other selected VNAS items (STEP 2904), and repeats the foregoing STEPS until all selected VNAS items have been processed.

The NAS manager thereafter recalculates the NAS-CPU operating ratio 1602 and the NAS memory usage ratio 1603 according to the contents of the changed VNAS performance simulation table 1600 (STEP 2905), and recalculates the controller-CPU operating ratio 1611 and the NAS-memory usage ratio 1603 (STEP 2906). The recalculation methods have been described above.

Figure 30:
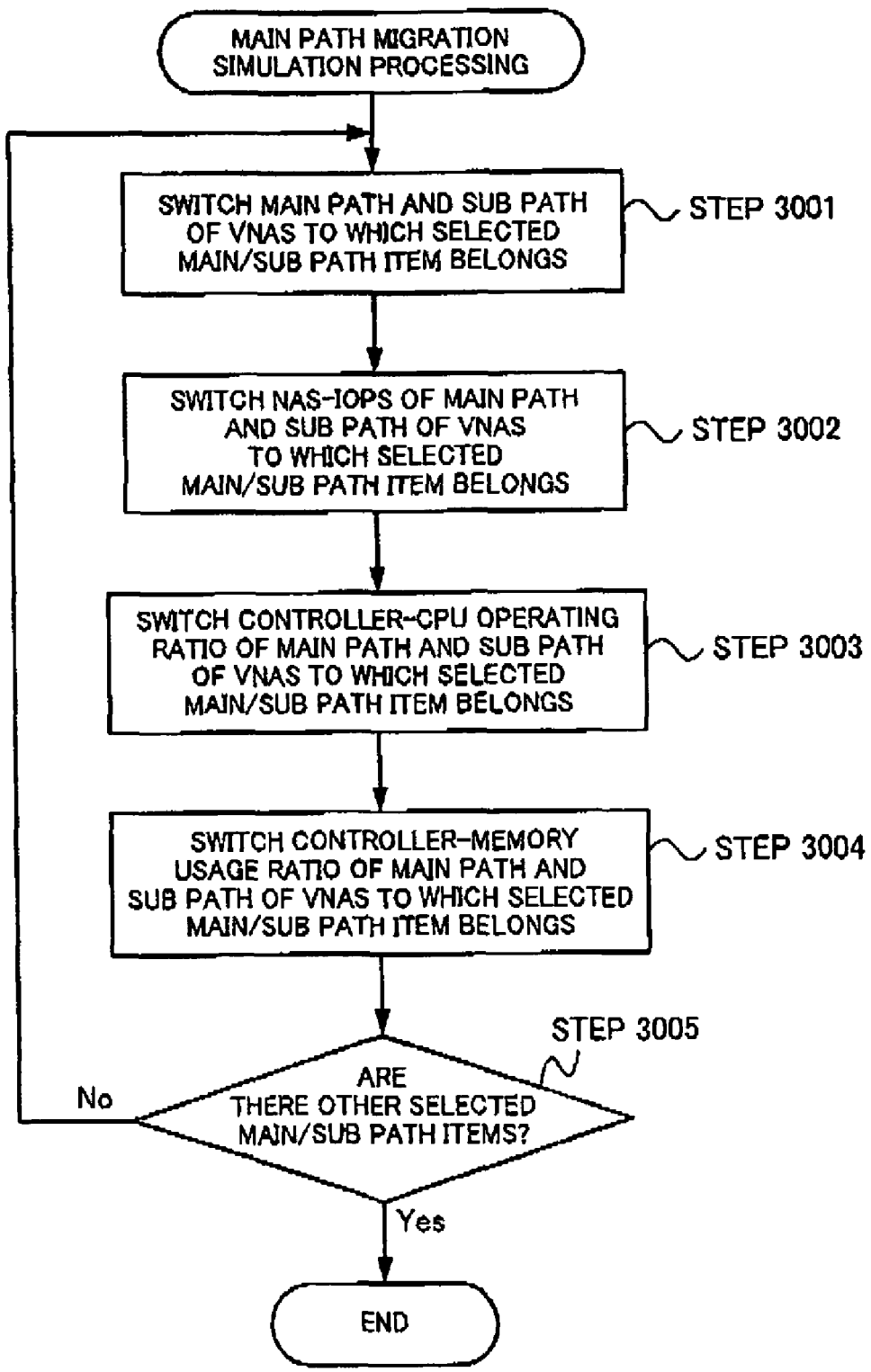
FIG. 30 is a flowchart explaining in detail the main path migration simulation processing to be performed by the management apparatus according to an embodiment of the present invention.

FIG. 30 is a flowchart explaining in detail the main path migration simulation processing to be performed by the management apparatus 13 according to an embodiment of the present invention.

Specifically, as shown in FIG. 30, the NAS manager switches the main path and sub path of the VNAS to which the main/sub path items selected by the system administrator in the VNAS performance simulation table 1600 belong (STEP 3001). The NAS manager thereafter switches the NAS-IOPS of the main path and sub path of the VNAS to which the selected main/sub path items belong (STEP 3002).

Further, the NAS manager switches the controller-CPU operating ratio of the main path and sub path of the VNAS to which the selected main/sub path items belong (STEP 3003).

The NAS manager thereafter switches the controller-memory usage ratio of the main path and sub path of the VNAS to which the selected main/sub path items belong (STEP 3004).

Subsequently, the NAS manager determines whether there are other selected main/sub path items (STEP 2904), and repeats the foregoing STEPS until all selected main/sub path items have been processed.

Figure 31:
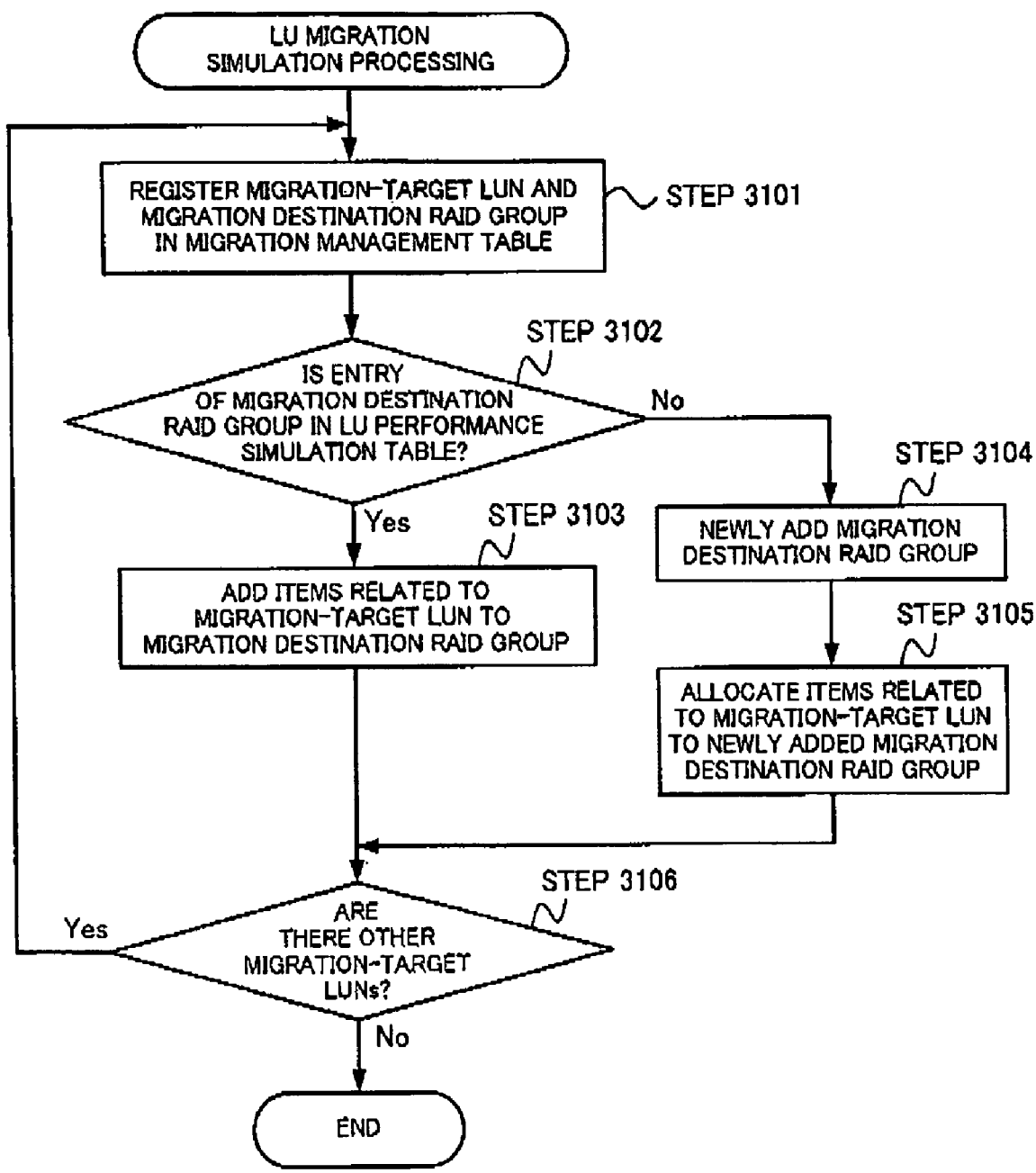
FIG. 31 is a flowchart explaining in detail the LU migration simulation processing to be performed by the management apparatus according to an embodiment of the present invention.

FIG. 31 is a flowchart explaining in detail the LU migration simulation processing to be performed by the management apparatus 13 according to an embodiment of the present invention.

Specifically, as shown in FIG. 31, the NAS manager registers the LUN (migration-target LUN) of the logical unit as the migration target and the number of the RAID group as the migration destination, which were selected by the system administrator from the LU performance simulation table 1700, in the migration management table 1900 (STEP 3101).

The NAS manager subsequently determines whether there is an entry regarding the migration destination RAID group in the LU performance simulation table 1700 (STEP 3102). If the NAS manager determines that an entry regarding the migration destination RAID group already exists (STEP 3102; Yes), it adds the migration-target LUN items and other related items to the entry of the migration destination RAID group (STEP 3103).

Meanwhile, if the NAS manager determines that an entry regarding the migration destination RAID group does not exist (STEP 3102; No), it adds the entry regarding the migration destination RAID group to the LU performance simulation table 1700 (STEP 3104), and allocates the migration-target LUN and its related items to the newly added migration destination RAID group (STEP 3105).

The NAS manager thereafter determines whether there are other selected main/sub path items (STEP 3106), and repeats the foregoing STEPS until all selected LUN items have been processed.

Figure 32:
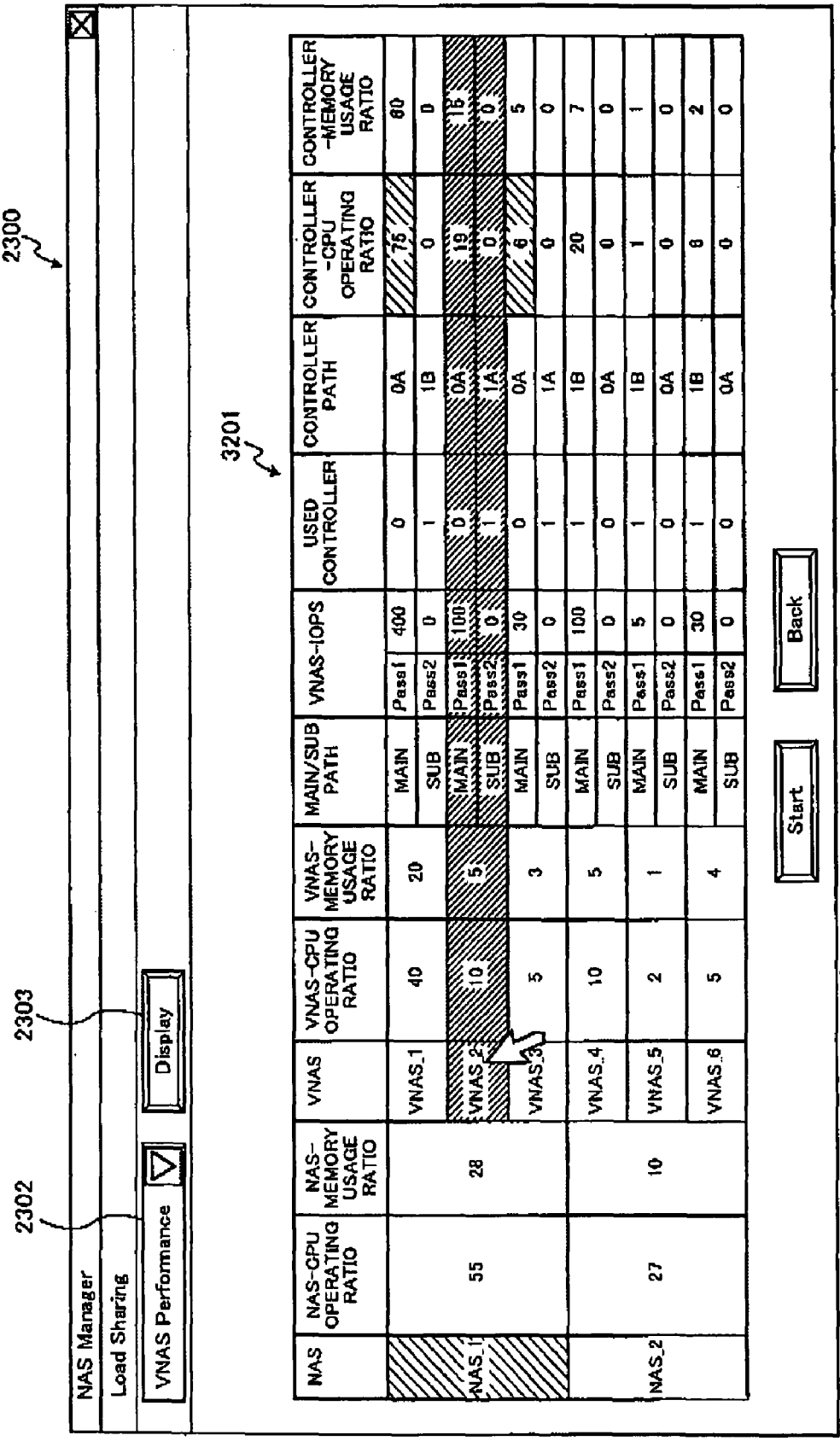
FIG. 32 is a diagram showing an example of a management window displayed on a user interface of the management apparatus according to an embodiment of the present invention.

For example, the system administrator selects the items to be changed in the management window 2300 providing the VNAS performance management information. Specifically, when the system administrator selects the "VNAS_2" in the management window 2300 providing the VNAS performance management information as shown in FIG. 23, items relating to the "VNAS_2" are visually differentiated and displayed as shown in FIG. 32. The system administrator may select a plurality of items to be changed (VNAS in this example).

Figure 33:
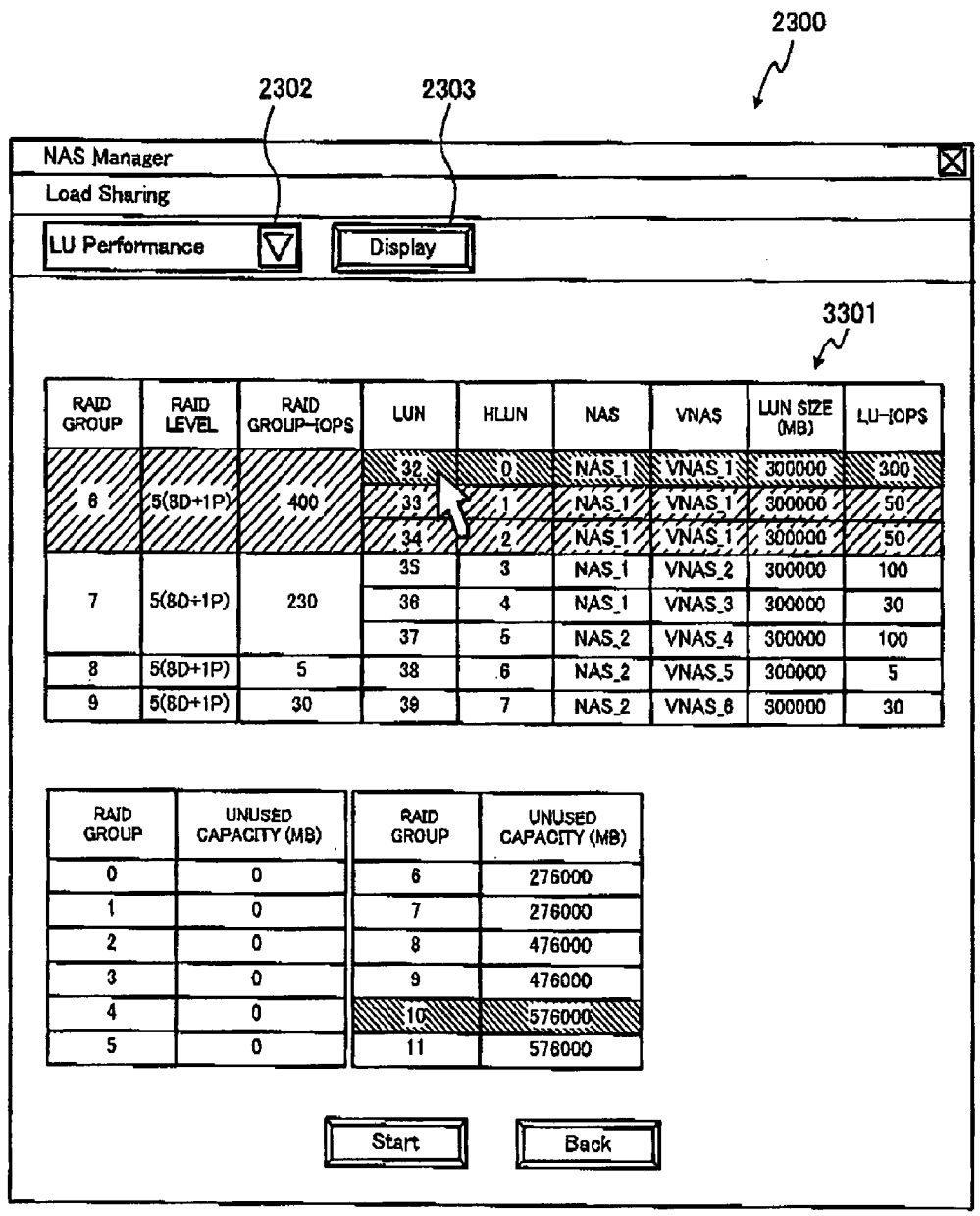
FIG. 33 is a diagram showing an example of a management window displayed on a user interface of the management apparatus according to an embodiment of the present invention.

If the system administrator is to subsequently perform simulation of the LU performance, the system administrator switches the displayed contents to the LU performance management information using the pulldown menu 2302 of the management window 2300, and thereafter selects the migration-target logical unit and the migration destination RAID group. Specifically, if the system administrator selects the "LUN_32" as the migration target and further selects the "RAID group_10" as the migration destination in the management window 2300 providing the LU performance information as shown in FIG. 24, items relating to the "LUN_32" and the RAID of "RAID group_10" are visually differentiated and displayed as shown in FIG. 33. The system administrator may select a plurality of items to be changed (i.e., LUN).

When the system administrator finishes selecting the items to be changed and presses the Start button 2304, the simulation processing regarding the system performance of the storage system 10 is executed with the selected items as the simulation conditions.

Figure 34:
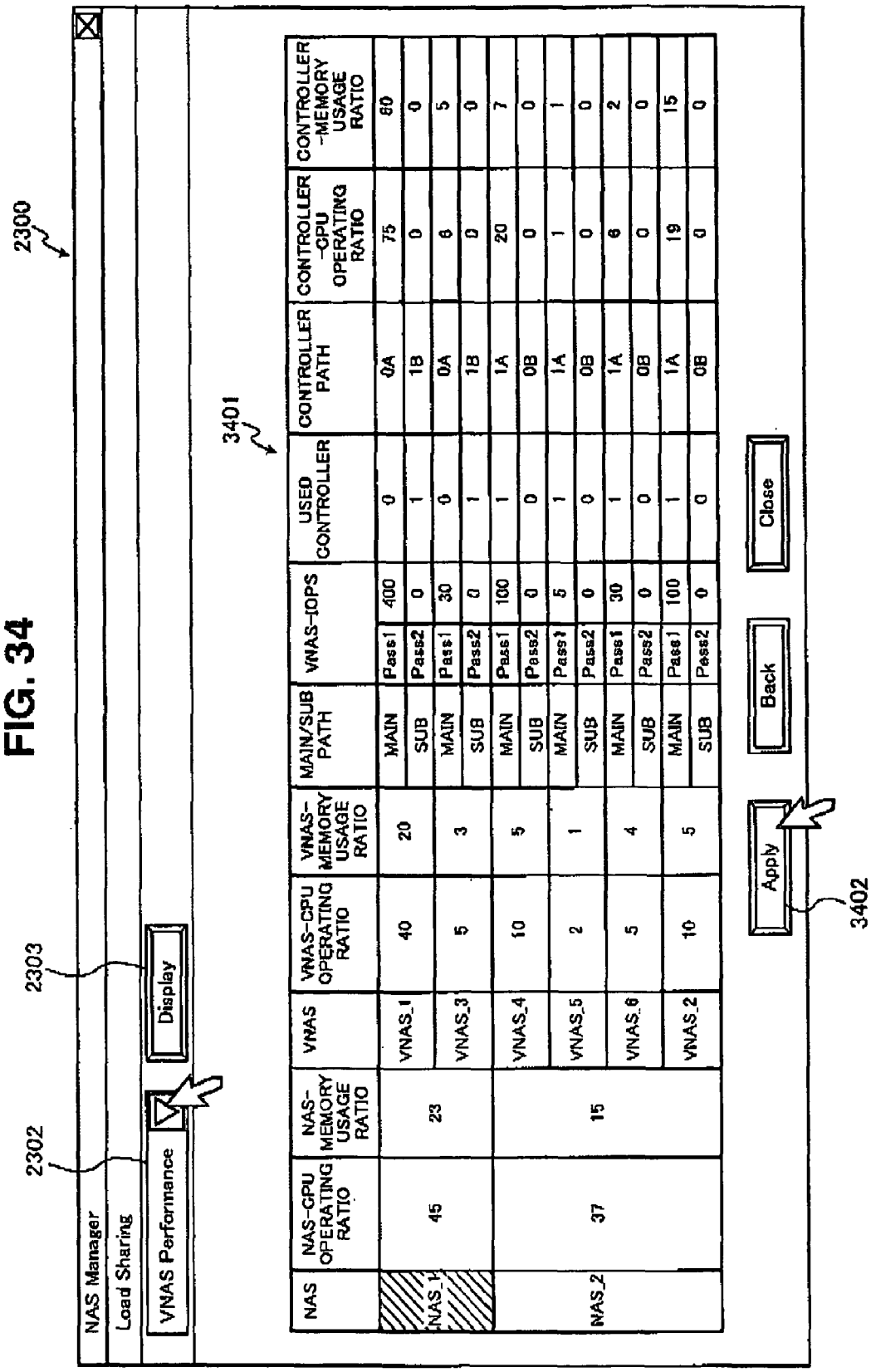
FIG. 34 is a diagram showing an example of a management window displayed on a user interface of the management apparatus according to an embodiment of the present invention.

FIG. 34 shows the simulation result of the VNAS performance information based on the selection of VNAS shown in FIG. 32. If items that exceed the threshold value in the VNAS performance simulation table 1600 are found as a result of the simulation, the NAS manager visually differentiates and displays such items. In this example, the "VNAS_2" is moved from the "NAS_1" to the "NAS_2." According to the simulation result, it would be understood that no item exceeds the threshold value.

Figure 35:
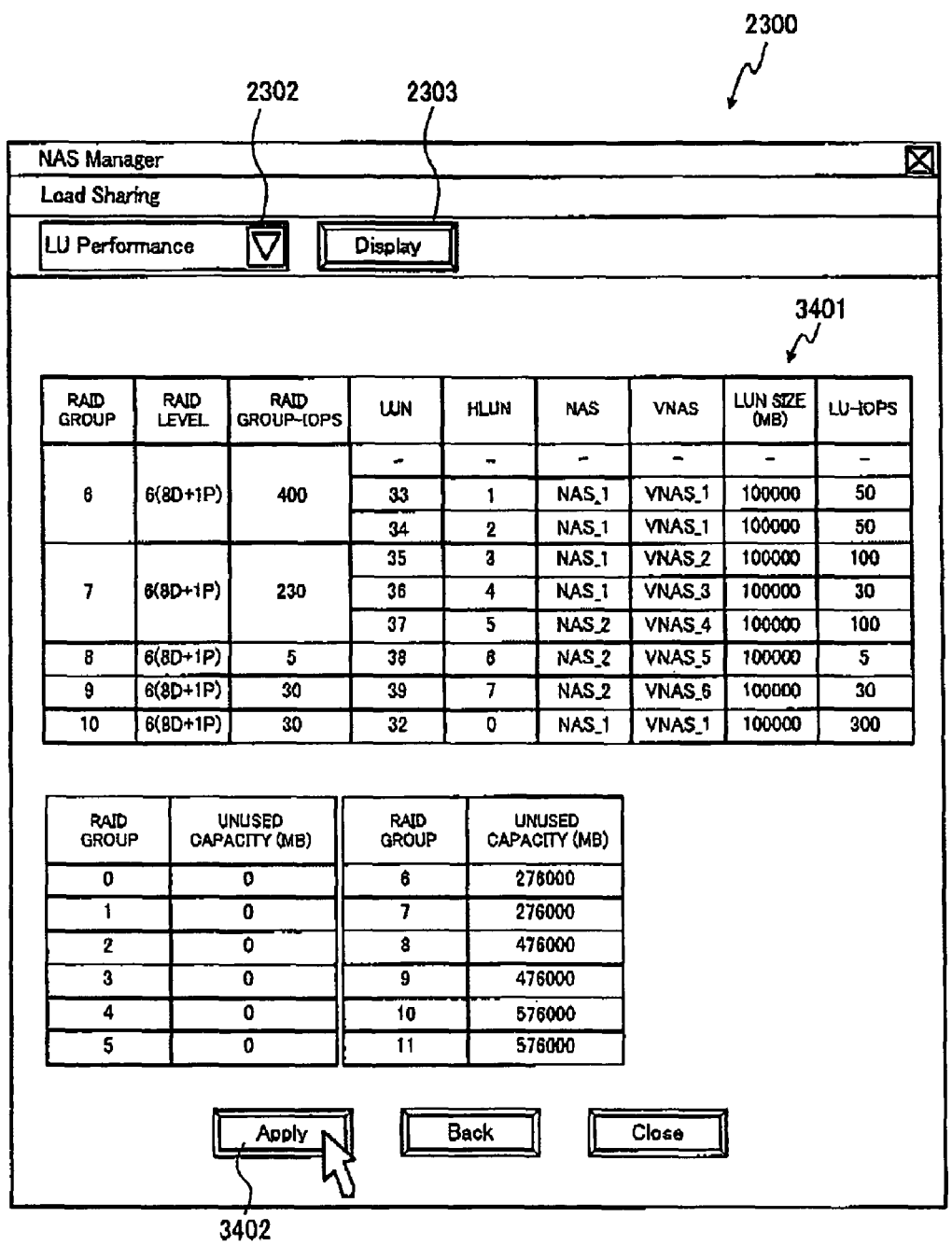
FIG. 35 is a diagram showing an example of a management window displayed on a user interface of the management apparatus according to an embodiment of the present invention.

FIG. 35 shows the simulation result of the LU performance information based on the selection of the migration-target LUN and the migration destination RAID group shown in FIG. 33. Similarly, if items that exceed the threshold value in the LU performance simulation table 1700 are found as a result of the simulation, the NAS manager visually differentiates and displays such items. In this example, the "LUN_32" is moved from the "RAID group_6" to the "RAID group_10." According to the simulation result, it would be understood that no item exceeds the threshold value.

(5-5) Simulation Result Reflection Processing

Figure 36:
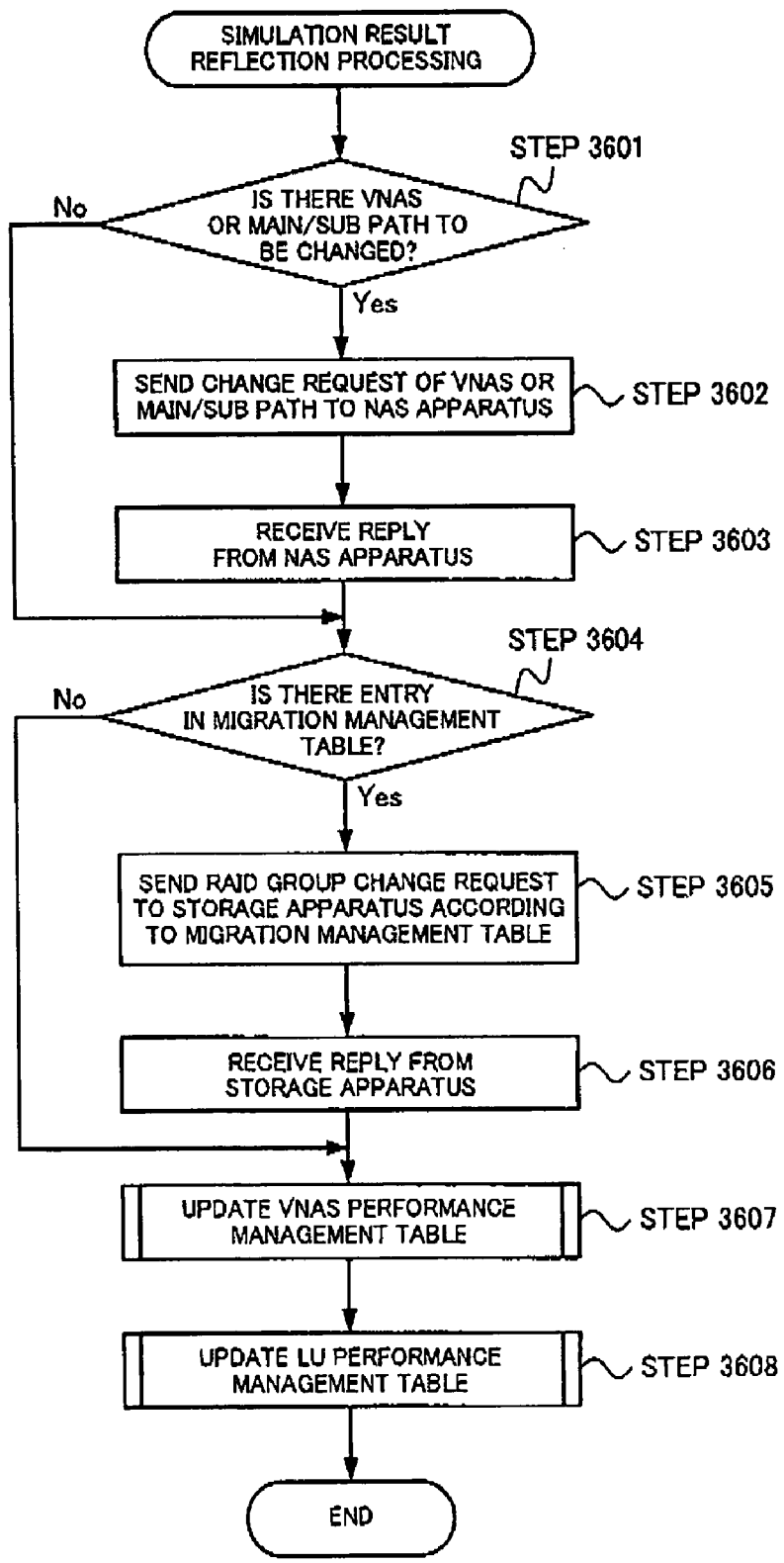
FIG. 36 is a flowchart explaining the simulation result reflection processing to be performed by the management apparatus according to an embodiment of the present invention.

FIG. 36 is a flowchart explaining the simulation result reflection processing to be performed by the management apparatus 13 according to an embodiment of the present invention.

Specifically, as shown in FIG. 36, the NAS manager compares the VNAS performance management table 1400 and the VNAS performance simulation table 1600 after the simulation, and determines whether there is any VNAS or main/sub path to be changed (STEP 3601). If the NAS manager determines that there is a VNAS or main/sub path to be changed (STEP 3601; Yes), it sends a change request of such VNAS or main/sub path to the NAS apparatus 11 (STEP 3602). The change request includes the VNAS number for changing the NAS apparatus 11 or the VNAS number for changing the main/sub path. The NAS apparatus 11 that received the change request changes the VNAS or the main/sub path according to the change request, and sends a completion reply to the management apparatus 13. The NAS manager receives the completion reply sent from the NAS apparatus 11 according to the change request (STEP 3603).

Subsequently, the NAS manager determines whether there is an entry in the migration management table 1900 (STEP 3604). If the NAS manager determines that an entry in the migration management table 1900 exists (STEP 3604; Yes), it creates a RAID group change request according to the migration management table 1900, and sends this to the controller 122 of the storage apparatus 12 (STEP 3605). The controller 122 that received the change request migrates the logical unit according to the change request, and sends a completion reply to the management apparatus 13. The NAS manager receives the completion reply sent from the controller 122 according to the change request (STEP 3606).

When the NAS manager receives the completion reply from the controller 122, it updates the VNAS performance management table 1400 based on the contents of the VNAS performance simulation table 1600 (STEP 3607), and also updates the LU performance management table 1500 based on the contents of the LU performance simulation table 1700 (STEP 3608).

By way of, the simulation result of the system performance is reflected in the NAS apparatus 11 and the storage apparatus 12, respectively.

(6) Other Embodiments

The foregoing embodiments are exemplifications for explaining the present invention, and are not intended to limit this invention only to the embodiments described above. The present invention may be worked in various modes so as long as it does not deviate from the gist of this invention. For instance, although the embodiments sequentially explained the processing of the various programs, the present invention is not limited thereto. Accordingly, the order of the processing may be switched or the processing may be performed in parallel so as long as there are no inconsistencies in the processing result.

Moreover, although the foregoing embodiments explained a configuration where the management apparatus 13 collects the operation information from the NAS apparatus 11 and the storage apparatus 12 by sending a transfer request, the present invention is not limited to this configuration. For example, the present invention may also be configured such that the NAS apparatus 11 and the storage apparatus 12 respectively send the operation information to the management apparatus 13 in given intervals.

In addition, although the foregoing embodiments explained a case of the system administrator selecting items that are exceeding the threshold value in the management window 2300 for the performing the simulation, the system administrator may also select items that are not exceeding the threshold value in order to obtain even higher performance.

The present invention can be broadly applied to storage systems using a NAS apparatus.

What is claimed is:

1. A storage system, comprising:
   a plurality of NAS apparatuses configured to provide a plurality of virtual file servers respectively to a plurality of host apparatuses;
   a storage apparatus operatively connected to the plurality of NAS apparatuses and including a plurality of drive units in which a plurality of logical units to be accessed by the plurality of virtual file servers are formed and a first controller and a second controller that control access by the plurality of virtual file servers to the plurality of logical units; and
   a management apparatus including a user interface and operatively connected to the plurality of NAS apparatuses and the storage apparatus,
   wherein the management apparatus sends a first send request for acquiring first performance information to the plurality of NAS apparatuses, and receives the first performance information sent from the plurality of NAS apparatuses in reply to the first send request, while the management apparatus sends a second send request for acquiring second performance information to the storage apparatus, and receives the second performance information sent from the storage apparatus in reply to the second send request,
   wherein the first performance information includes a first I/O amount per unit time in relation to a first virtual file server and a first port coupled to the first controller, a second I/O amount per unit time in relation to the first virtual file server and a second port coupled to the second controller, a third I/O amount per unit time in relation to a second virtual file server and the first port coupled to the first controller, and a fourth I/O amount per unit time in relation to the second virtual file server and the second port coupled to the second controller,
   wherein the second performance information includes a first total operating ratio of the first controller and a second total operating ratio of the second controller,
   wherein the management apparatus calculates a first operating ratio of the first controller regarding the first virtual file server based on the first total operating ratio, the first I/O amount per unit time, and the third I/O amount per unit time, a second operating ratio of the first controller regarding the second virtual file server based on the first total operating ratio, the first I/O amount per unit time, and the third I/O amount per unit time, a third operating ratio of the second controller regarding the first virtual file server based on the second total operating ratio, the second I/O amount per unit time, and the fourth I/O amount per unit time, and a fourth operating ratio of the second controller regarding the second virtual file server based on the second total operating ratio, the second I/O amount per unit time, and the fourth I/O amount per unit time, and
   wherein the management apparatus displays system performance information including the calculated first operating ratio, the calculated second operating ratio, the calculated third operating ratio, and the calculated fourth operating ratio on the user interface, and, if a value of one of the calculated first operating ratio, the calculated second operating ratio, the calculated third operating ratio, and the calculated fourth operating ratio is greater than a predetermined threshold value, adds a specific item to one of the calculated first operating ratio, the calculated second operating ratio, the calculated third operating ratio, and the calculated fourth operating ratio.

2. The storage system according to claim 1, wherein at least one of the plurality of logical units is formed in at least one of a plurality of RAID groups which are configured based on the plurality of drive units.

3. The storage apparatus according to claim 1, wherein the management apparatus receives a selection of an item of the displayed system performance information via the user interface, executes simulation of system performance information according to the selection, and displays an execution result of the simulation on the user interface.

4. The storage system according to claim 3, wherein, upon receiving a selection of an item concerning a specific virtual file server of the displayed system performance information via the user interface, the management apparatus executes simulation of the system performance information under the condition that the selected specific virtual file server has been migrated to a NAS apparatus other than the NAS apparatus having the selected specific virtual file server, and displays an execution result of the simulation on the user interface.

5. The storage system according to claim 3, wherein, upon respectively receiving selections of an item concerning a specific logical unit and an item of a RAID group of the displayed system performance information via the user interface, the management apparatus executes simulation of the system performance information under the condition that the selected specific logical unit has been migrated to the selected RAID group, and displays an execution result of the simulation on the user interface.

6. The storage system according to claim 3, wherein the management apparatus sends a system configuration change request to the NAS apparatus and the storage apparatus so that the execution result of the simulation according to the selection is reflected, and the NAS apparatus and the storage apparatus respectively change its system configuration based on the system configuration change request sent from the management apparatus.

* * * * *